(12) United States Patent
Grass

(10) Patent No.: US 12,251,048 B2
(45) Date of Patent: Mar. 18, 2025

(54) SYSTEM FOR AUTOMATICALLY PREPARING MEALS ACCORDING TO A SELECTED RECIPE AND METHOD FOR OPERATING THE SAME

(71) Applicant: CHEF JASPER INC., Montréal (CA)

(72) Inventor: Gunnar Grass, Montreal (CA)

(73) Assignee: CHEF JASPER INC., Montreal (CA)

( * ) Notice: Subject to any disclaimer, the term of this patent is extended or adjusted under 35 U.S.C. 154(b) by 665 days.

(21) Appl. No.: 16/635,171

(22) PCT Filed: Aug. 2, 2018

(86) PCT No.: PCT/IB2018/055830
§ 371 (c)(1),
(2) Date: Jan. 30, 2020

(87) PCT Pub. No.: WO2019/026027
PCT Pub. Date: Feb. 7, 2019

(65) Prior Publication Data
US 2020/0154948 A1 May 21, 2020

Related U.S. Application Data

(60) Provisional application No. 62/541,419, filed on Aug. 4, 2017.

(51) Int. Cl.
A47J 43/07 (2006.01)
A47J 44/00 (2006.01)
(Continued)

(52) U.S. Cl.
CPC ............ *A47J 43/07* (2013.01); *A47J 44/00* (2013.01); *A23L 5/10* (2016.08); *A47J 27/004* (2013.01); *A47J 36/32* (2013.01)

(58) Field of Classification Search
None
See application file for complete search history.

(56) References Cited

U.S. PATENT DOCUMENTS 5,386,762 A 2/1995 Gokey
7,174,830 B1 2/2007 Dong
(Continued)

FOREIGN PATENT DOCUMENTS

CN 206137866 5/2017
CN 206137866 U * 5/2017 ............... A47J 27/00
(Continued)

OTHER PUBLICATIONS

Machine translation of CN 206137866 U performed on Nov. 3, 2022, Wang (Year: 2017).*

(Continued)

*Primary Examiner* — Dana Ross
*Assistant Examiner* — Kevin Guanhua Wen
(74) *Attorney, Agent, or Firm* — PEARL COHEN ZEDEK LATZER BARATZ LLP

(57) ABSTRACT

A system is disclosed for automatically preparing meals according to a selected recipe. The system comprises a food processing unit for performing a set of food preparation tasks, wherein the food processing unit comprises at least one multifunctional cooking device adapted for performing a first food preparation task selected from a group consisting of mixing, stirring and chopping and a second food preparation task comprising heating; a plurality of food containers, each food container for storing a given ingredient; an identification unit for identifying the selected given food container; a collecting element for collecting a selected given food container of either the plurality of food containers located in a vicinity of the collecting element or from another plurality of food containers located in one of a fridge (Continued)

and a freezer located in a vicinity of the collecting element, the collecting element comprising a grabbing member for grabbing the selected given food container; further wherein the collecting element is moveable along a substantially vertical axis and a control system operatively connected to the food processing unit, to the identification unit and to the collecting element, the control system adapted to manage the food processing unit and the collecting element to thereby prepare food according to a selected recipe.

28 Claims, 19 Drawing Sheets

(51) Int. Cl.
 *A23L 5/10* (2016.01)
 *A47J 27/00* (2006.01)
 *A47J 36/32* (2006.01)

(56) References Cited

U.S. PATENT DOCUMENTS

| | | | |
|---|---|---|---|
| 8,276,506 | B2 | 10/2012 | Tojo et al. |
| 8,820,219 | B2 | 9/2014 | Buehler |
| 8,934,994 | B1 | 1/2015 | Lee |
| 9,131,807 | B2 | 9/2015 | Roy et al. |
| 2004/0173103 | A1 | 9/2004 | Won |
| 2006/0115889 | A1 | 6/2006 | Nakashima et al. |
| 2009/0099691 | A1* | 4/2009 | Tojo et al. ............. G06F 19/00 700/253 |
| 2013/0101714 | A1* | 4/2013 | Buehler ................. A47J 44/00 426/416 |
| 2014/0230660 | A1 | 8/2014 | He |
| 2015/0066200 | A1* | 3/2015 | McCarthy et al. ..... B07C 5/342 700/223 |
| 2015/0128536 | A1 | 5/2015 | Liu et al. |
| 2015/0272371 | A1 | 10/2015 | Gagnon |
| 2015/0290795 | A1 | 10/2015 | Oleynik |
| 2016/0015219 | A1 | 1/2016 | Rosalia et al. |
| 2016/0059412 | A1* | 3/2016 | Oleynik .................... B25J 9/16 |
| 2016/0067866 | A1 | 3/2016 | Sekar et al. |
| 2016/0081515 | A1 | 3/2016 | Aboujassoum et al. |
| 2016/0235239 | A1 | 8/2016 | Patadia |
| 2017/0354294 | A1 | 12/2017 | Shivaiah |
| 2018/0070776 | A1 | 3/2018 | Ganninger |

FOREIGN PATENT DOCUMENTS

| | | | |
|---|---|---|---|
| CN | 107028478 | 8/2017 | |
| DE | 19744488 | 4/1999 | |
| GB | 2546507 A * | 7/2017 | ............. A47J 44/02 |
| GB | 2547286 | 8/2017 | |
| IN | 798DE2014 | 9/2015 | |
| IN | 1458CHE2009 | 4/2016 | |
| JP | 2004-220414 | 8/2004 | |
| JP | 2006149268 A | 6/2006 | |
| JP | 2006-215837 | 8/2006 | |
| JP | 2012071317 A | 4/2012 | |
| JP | 2015150424 A | 8/2015 | |
| JP | 2017-506169 | 3/2017 | |
| JP | 2017056221 A | 3/2017 | |
| WO | WO 2015075730 A2 * | 5/2015 | ............. G06F 17/00 |
| WO | WO 2015/125017 | 8/2015 | |
| WO | WO 2015195985 A1 * | 12/2015 | ............... A23L 1/00 |
| WO | WO 2016011372 A2 * | 1/2016 | ............... B67D 1/08 |
| WO | WO 2016/078241 | 5/2016 | |
| WO | WO 2017/055832 | 4/2017 | |
| WO | WO 2019/026027 | 2/2019 | |

OTHER PUBLICATIONS

International Search Report and the Written Opinion Dated Dec. 11, 2018 From the International Searching Authority Re. Application No. PCT/IB2018/055830. (8 Pages).
Charlton "Robotic Chef Can Cook Michelin Star Food in Your Kitchen by Mimicking World's Best Cooks", IBTimes UK, 3 P., Apr. 14, 2015.
Garfield "MIT Students Invented A Robotic Kitchen That Could Revolutionize Fast Food", Tech Insider, 5 P., Apr. 18, 2016.
Houser "Super Fast SLS Parts—3D Printed Food: 20 Most Frequently Asked Questions", All3DP, Blog, p. 1-15, Aug. 24, 2016.
Kronsberg "Testing Do-It-All Kitchen Appliances That Chop, Blend, Stir and Cook", The Wall Street Journal, 4 P., Jun. 2, 2016.
Wilhelm "Sereneti Kitchen Robot Cooks So You Don't Have To", AOL Tech, Blog, 5 P., Oct. 1, 2015.
English Translation of Search Report for Application No. JP2020-528532, dated Jul. 18, 2023.
Office Action for Japanese Application No. 2023-166186, dated Oct. 1, 2024.
Final Office Action for Japanese Application No. 2023-166186, dated Jan. 21, 2025.

* cited by examiner

SYSTEM FOR AUTOMATICALLY PREPARING MEALS ACCORDING TO A SELECTED RECIPE AND METHOD FOR OPERATING THE SAME

RELATED APPLICATIONS

This application is a National Phase of PCT Patent Application No. PCT/IB2018/055830 having International filing date of Aug. 2, 2018, which claims the benefit of priority under 35 USC § 119(e) of U.S. Provisional Patent Application No. 62/541,419 filed on Aug. 4, 2017. The contents of the above applications are all incorporated by reference as if fully set forth herein in their entirety.

FIELD AND BACKGROUND OF THE INVENTION

The present invention relates to the field of food preparation automation and more particularly to a system and method for automatically preparing meals according to a selected recipe.

Automated cooking systems and appliances are widely used in households or even in restaurants or cafeterias to help users prepare food for themselves, their family, friends or customers.

Automated cooking systems and appliances such as rice cookers, mixers, blenders, pressure cookers, slow cookers or steamers have been developed over the years to help a user cook, and they usually provide several functions such as blending, stirring, heating, steaming, mixing, etc. They have evolved over the years to become more integrated and therefore, nowadays, a cooking appliance may simultaneously be a slow cooker and a blender or a steamer.

However, automated cooking systems and appliances tend to be heavily dependent on humans, as they usually need at least one physical input such as providing the food or turning on the systems or appliances or even switching ingredients as a certain step in a recipe is achieved. Furthermore, nowadays people tend to have a reduced amount of time or interest to cook; certain people tend to have low cooking skills and/or bad eating habits and wish to have good-quality food without spending too much. Automated cooking systems and appliances such as those previously enumerated can also only account for a portion of the preparation of a meal and therefore will require an important investment by a user to complete the meal preparation.

Moreover, for places like restaurants and cafeterias, it is often costly to teach and pay employees to cook food for clients.

There is therefore a need for a system for automatically preparing meals according to a selected recipe and method for operating the same.

SUMMARY OF THE INVENTION

According to a broad aspect, there is disclosed a system for automatically preparing meals according to a selected recipe, the system comprising a food processing unit for performing a set of food preparation tasks, wherein the food processing unit comprises at least one multifunctional cooking device adapted for performing a first food preparation task selected from a group consisting of mixing, stirring and chopping and a second food preparation task comprising heating; a plurality of food containers, each food container for storing a given ingredient; an identification unit for identifying the selected given food container; a collecting element for collecting a selected given food container of either the plurality of food containers located in a vicinity of the collecting element or from another plurality of food containers located in one of a fridge and a freezer located in a vicinity of the collecting element, the collecting element comprising a grabbing member for grabbing the selected given food container; further wherein the collecting element is moveable along a substantially vertical axis and a control system operatively connected to the food processing unit, to the identification unit and to the collecting element, the control system adapted to manage the food processing unit and the collecting element to thereby prepare food according to a selected recipe.

According to an embodiment, the food processing unit further comprises a water cooker adapted for performing one of a regular cooking task and a sous-vide food preparation task.

According to an embodiment, the system further comprises a food container opening mechanism.

According to an embodiment, at least one food container is stored in a furniture unit.

According to an embodiment, the furniture unit comprises at least one storage compartment for storing at least one corresponding food container.

According to an embodiment, at least one storage compartment of the at least one storage compartment comprises at least one drawer for storing at least one food container.

According to an embodiment, each of the plurality of food containers comprises a corresponding identification means.

According to an embodiment, each identification means is selected from a group consisting of an SKU barcode, an RFID tag, a graphic element, a QR code and a text.

According to an embodiment, the graphic element comprises at least one of an icon and a symbol.

According to an embodiment, the identification unit comprises an identification camera for identifying the identification means of the at least one food container.

According to an embodiment, the collecting element comprises at least one member displaceable in a horizontal plane.

According to an embodiment, the collecting element comprises a proximal member, displaceable along the substantially vertical axis; at least one intermediate member, rotatable in the horizontal plane and rotatably coupled to the proximal member; and a distal member, rotatable in the horizontal plane and rotatably coupled to the at least one intermediate member, the distal member comprising the grabbing member for grabbing a selected food container.

According to an embodiment, the system further comprises at least one load cell for measuring a corresponding weight of an ingredient.

According to an embodiment, the proximal member is coupled to the at least one intermediate member using a motor.

According to an embodiment, the at least one intermediate member and the distal member are coupled using at least one motor.

According to an embodiment, the motor coupling the proximal member to the at least one intermediate member and the motor coupling the at least one intermediate member to the distal member each comprises an encoder for providing spatial information of the at least one intermediate member and the distal member to the control system.

According to an embodiment, the proximal member is moved along a wall of the furniture unit.

According to an embodiment, the grabbing member is configured to be rotated in a position for grabbing or releasing a selected food container, the grabbing member being rotatable around a first axis of rotation and around a second axis of rotation, wherein the first axis of rotation is perpendicular to the second axis of rotation.

According to an embodiment, the grabbing member comprises at least two grippers operated by movable means, each gripper comprising a contact surface for contacting a selected food container and wherein at least one gripper is movable for grabbing or releasing a selected food container.

According to an embodiment, at least one gripper of the at least two grippers comprises a food quality detector.

According to an embodiment, at least one gripper of the at least two grippers comprises a vibrating element for shaking a given food container for dispensing an ingredient.

According to an embodiment, the vibrating element comprises a motor.

According to an embodiment, the grabbing member comprises a suction assembly for creating a vacuum to thereby grab a mating surface.

According to an embodiment, the control system is operated via a user interface.

According to an embodiment, the user interface is selected from a group comprising at least one of a touchscreen, a voice recognition software, an application platform and a keyboard.

According to an embodiment, the control system is operated by a user via a wireless connection.

According to a broad aspect, there is disclosed a method for automatically preparing food according to a selected recipe, the method comprising providing an indication of a food preparation, the food preparation requiring at least one ingredient; determining an availability of a user for providing the at least one missing ingredient; selecting a recipe; checking if the at least one required ingredient for preparing the selected recipe is available; if the at least one required ingredient is available obtaining a task schedule for the food preparation; and executing the obtained task schedule using the system disclosed above.

According to an embodiment, the indication of a food preparation to be prepared comprises an indication of a choice of food to be prepared, an indication of a desired time for completing the food preparation and an indication of a number of guest for which the food is prepared.

According to an embodiment, the system randomly selects a recipe based on a profile of the user.

According to an embodiment, the profile of the user comprises at least one recipe selected by the user.

According to an embodiment, the checking to find out if at least one ingredient required for preparing the selected recipe is available is carried out using the collecting element, displaceable for grabbing a selected food container located in the vicinity thereof; the grabbing member of the collecting element for grabbing the selected food container; at least one load cell of the collecting element for measuring the weight of the selected food container and for transmitting the measured weight to the control system; the identification unit for identifying an identification means of the grabbed food container and for transmitting the information of the grabbed food container to the control system; and the control system for receiving the information provided by the at least one load cell and the identification unit and for evaluating the feasibility of the selected recipe.

According to an embodiment, the information transmitted to the control system by the collecting element and the identification unit comprises a type of ingredient stored in a given food container, an expiry date of the ingredient and a weight of the given food container.

According to an embodiment, if the user is not available to provide the at least one missing ingredient, the method further comprises providing a list of at least one alternative recipe.

According to an embodiment, the identification means of the food container is selected from a group comprising at least one of an SKU barcode, an RFID tag, a graphic element, a QR code and a text.

According to an embodiment, the method further comprises providing a notification to the user once the task schedule is executed.

According to an embodiment, the collecting element comprises a portion of a multiaxis robot.

According to an embodiment, the multiaxis robot comprises a six-axis robot.

According to an embodiment, the collecting element comprises a Cartesian coordinate arm having a plurality of linear connections, each actuated by a linear actuator.

According to an embodiment, the system further comprises a device for detecting a human presence in close vicinity to the system.

According to an embodiment, the grabbing member is adapted to avoid a direct interaction with food.

According to an embodiment, the identification unit comprises a lookup table operatively connected to the control system and comprising for each food container an indication of a respective content and a respective physical location.

According to an embodiment, the system further comprises a camera operatively connected to the control system and providing corresponding positioning data associated with at least one of the food processing unit, the plurality of food containers and the collecting element.

According to an embodiment, the food processing unit is operatively connected to the control system using at least one of a USB connection, a WLAN connection, a network cable and a Bluetooth connection.

According to an embodiment, the control system is operatively connected to a point-of-sale system comprising at least one of a payment terminal, a touch screen, a QR code reader and a bar code scanner.

According to an embodiment, the collecting element is located behind a fenced area.

According to an embodiment, at least one part of the fenced area comprises a transparent material.

According to an embodiment, at least one part of the fenced area comprises an aperture sized and shaped for allowing an access to the food processing unit.

BRIEF DESCRIPTION OF THE SEVERAL VIEWS OF THE DRAWINGS

Having thus generally described the nature of the invention, reference will now be made to the accompanying drawings, showing by way of illustration a preferred embodiment thereof and in which.

DESCRIPTION OF SPECIFIC EMBODIMENTS
OF THE INVENTION

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a system 100 for automatically preparing food according to a selected recipe and a method for operating the same.

Figure 1:
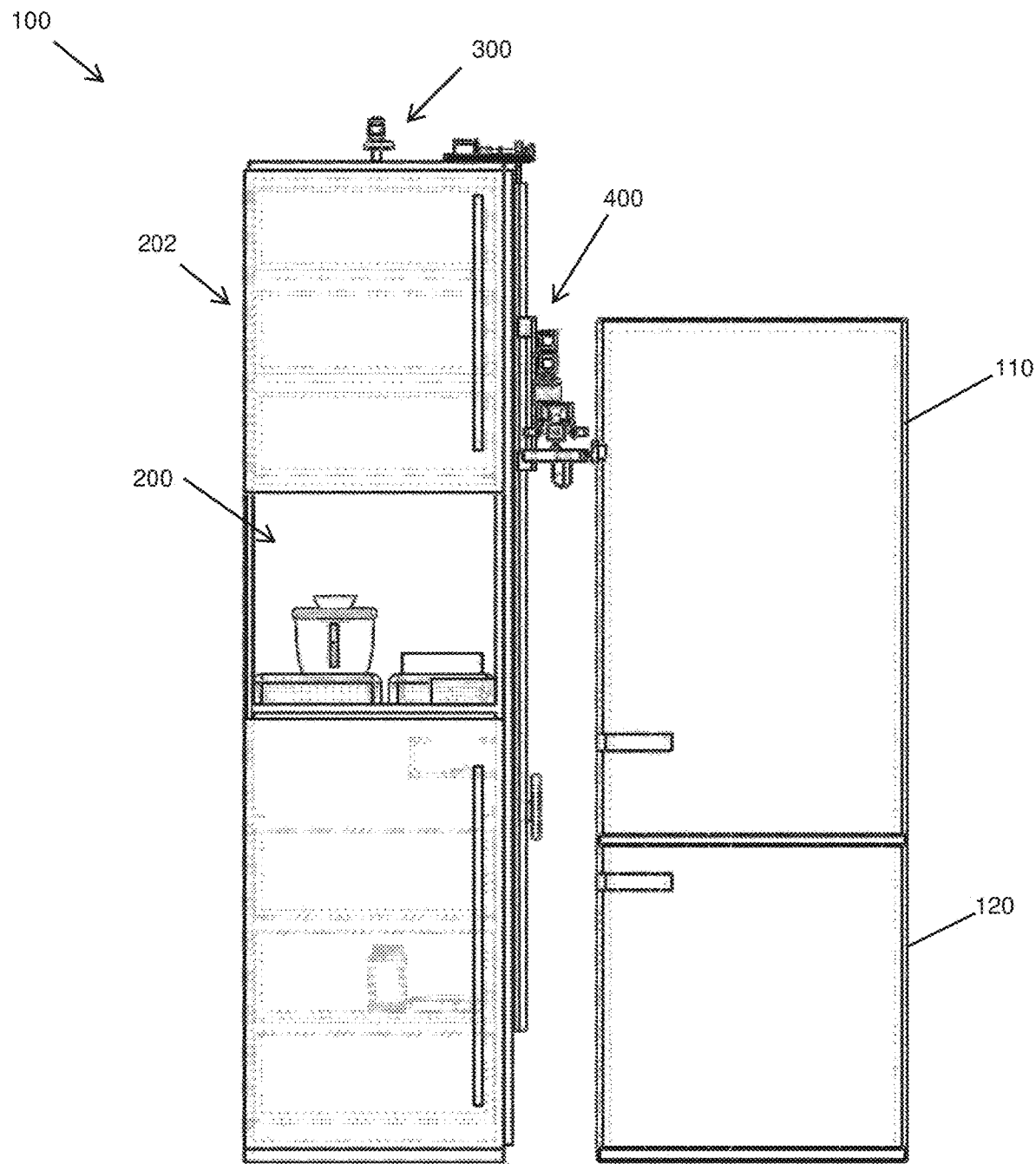
FIG. 1 is a front view of a system for automatically preparing meals according to a selected recipe, the system comprising a food processing unit, an identification unit, a collecting element and a fridge and a freezer located in the vicinity thereof.
Figure 2:
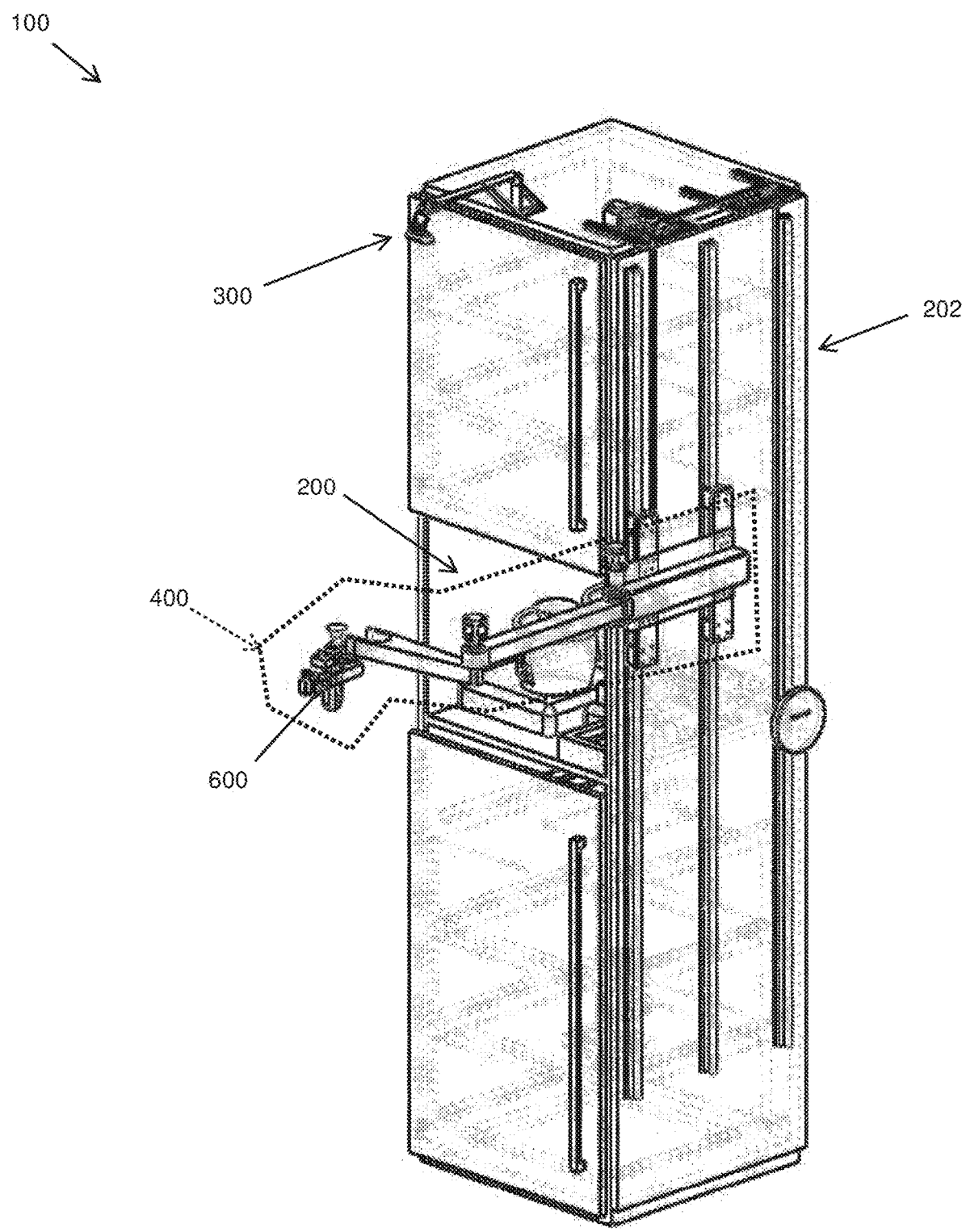
FIG. 2 is a perspective view of the system for better showing the collecting element comprising a grabbing member, the identification unit as well as the food processing unit.

Now referring to FIGS. 1 and 2, the system 100 is configured for automatically preparing food according to a selected recipe and is adapted to be installed in a variety of environments or locations such as a household kitchen, a restaurant kitchen, a cafeteria and the like. In the illustrated embodiment of FIG. 1, the system 100 is positioned in the vicinity of a fridge 110 and a freezer 120.

The system 100 comprises a food processing unit 200. In fact, it will be appreciated that the food processing unit 200 is used for performing a set of food preparation tasks. More precisely, the food processing unit 200 comprises at least one multifunctional cooking device adapted for performing a first food preparation task selected from a group consisting of mixing, stirring and chopping and a second food preparation task comprising heating. It will be appreciated that using a multifunctional cooking device is of great advantage since it enables the performing of various food preparation tasks in an integrated and robust manner. The food processing unit 200 is operatively connected to a control system 500 (not shown) for automatically preparing food according to the selected recipe. It will be appreciated that the food processing unit 200 may be operatively connected to the control system 500 using at least one of a Universal Serial Bus (USB) connection, a Wireless Local Area Network (WLAN) connection, a network cable and a Bluetooth™ connection. The skilled addressee will appreciate that various alternative embodiments may be possible.

In one embodiment, the food processing unit 200 is located in a furniture unit 202 and may further comprise at least one cooking device, at least one sous-vide cooker and a food container opening mechanism or the like, as it will be explained in more detail below.

In accordance with one embodiment, the multifunctional cooking device is a Thermomix® manufactured by the company Vorwerk & Co. Alternatively, other multifunctional devices may be considered.

The system 100 further comprises a plurality of food containers (not shown), stored in the vicinity thereof, wherein each food container is configured to store a given ingredient.

In one embodiment, the plurality of food containers are stored in a plurality of storage compartments of the furniture unit 202.

In one embodiment, the plurality of storage compartments each comprises a plurality of drawers adapted to receive the plurality of food containers.

In an alternative embodiment, the plurality of food container are stored in the fridge 110 and/or in the freezer 120.

In one embodiment, the plurality of food containers are adapted to contain the same ingredient.

In an alternative embodiment, the plurality of food containers may be adapted to contain different ingredients.

In one embodiment, each food container comprises a graphic element which is an embodiment of an identification means.

In one embodiment, the graphic element comprises a standardized icon or a symbol. Alternatively, the identifications means may comprise a text. The identifications means are adapted to be identified using an identification camera in collaboration with a computer vision software for processing signals generated thereby, as it will be explained in more details below. The identification means are configured to store information relating to the ingredient stored in the food container, such as the type of ingredient, the quantity of the given ingredient, the date of expiry of the ingredient according to the purchase date, etc.

In an alternative embodiment, the food containers may comprise different identification means such as Stock Keeping Unit (SKU) barcodes (hereinafter SKU barcodes), RFID tags, a Quick Response (QR) code or the like. In this embodiment, an SKU barcode or RFID tag is associated with each food container and is configured to store information relating to the ingredient stored in the food container, such as the type of ingredient, the quantity of the given ingredient, the date of expiry of the ingredient according to the purchase date, etc.

In one embodiment, the food container is comprised of one sous-vide bag.

The system 100 further comprises an identification unit 300 for identifying a selected given food container. The identification unit 300 is operatively connected to the control system 500 for automatically identifying the identification means of the selected food containers for providing the suitable food container of a selected recipe to the food processing unit 200.

In one embodiment, the identification unit 300 is adapted to identify the identification means of the food containers, such as the standardized icon, simple text, SKU barcodes, QR codes or RFID tags. The identified information of a given food container is then sent to the control system 500 for processing, as it will be explained below.

In another embodiment, the identification unit 300 comprises a lookup table operatively connected to the control system 500. Such lookup table comprises for each food container an indication of a respective content and a respective physical location.

In one embodiment, the identification unit 300 identifies food containers located in the plurality of drawers of the furniture unit 202, the fridge 110 and/or the freezer 120.

In one embodiment, the identification unit 300 is removably located on top of the furniture unit 202 for enabling the identification of the plurality of food containers stored in the vicinity of the system 100.

In an alternative embodiment, the identification unit 300 may be located elsewhere, while still enabling the identification of the plurality of food containers.

The system 100 further comprises a collecting element 400 for collecting a selected given food container of either the plurality of food containers located in the vicinity of the collecting element 400 or from another plurality of food containers located in a fridge 110 and/or freezer 120 located in the vicinity of the collecting element 400.

In one embodiment, the collecting element 400 grabs the food containers or the sous-vide bags located in the plurality of drawers of the storage compartments of the furniture unit 202, in the fridge 110 or in the freezer 120.

In one embodiment, the collecting element 400 comprises a grabbing member 600, shown in FIG. 2, for grabbing a selected given food container identified by the identification unit 300. The collecting element 400 is moveable along a vertical axis and is operatively connected to and operated by the control system 500, as it will be explained below.

It should be understood that the collecting element 400 may be moveable along a slightly inclined axis while still grabbing and displacing given food containers for preparing the selected recipe. Moreover and as further illustrated below, it will be appreciated that in one embodiment, the grabbing member 600 is adapted to avoid a direct interaction with food, which is of great advantage for various reasons. A first reason is that avoiding a direct interaction with food ensures food safety. Another reason is that the food waste is much smaller than if the grabbing member 600 were able to perform a direct interaction with food. Another reason is that the cleaning is much easier if there is no direct interaction of the grabbing member 600 with the food, as no food has to be removed from the grabbing member 600 in such case.

The system 100 further comprises the control system 500, operatively connected to the food processing unit 200, to the identification unit 300 and to the collecting element 400. The control system 500 is adapted to manage the food processing unit 200 and the collecting element 400 to thereby prepare a meal according to a selected recipe. Moreover, the control system 500 is connected to the identification unit 300 for identifying the food containers to be grabbed by the collecting element 400 and dispensed in the food processing unit 200.

In one embodiment, the control system 500 is wired to the food processing unit 200, the identification unit 300 and to the collecting element 400 by conventional network wires.

In an alternative embodiment, the control system 500 may be operatively connected to the food processing unit 200, to the identification unit 300 and to the collecting element 400 by conventional short-range wireless means such as Wi-Fi or Bluetooth®.

Figure 3:
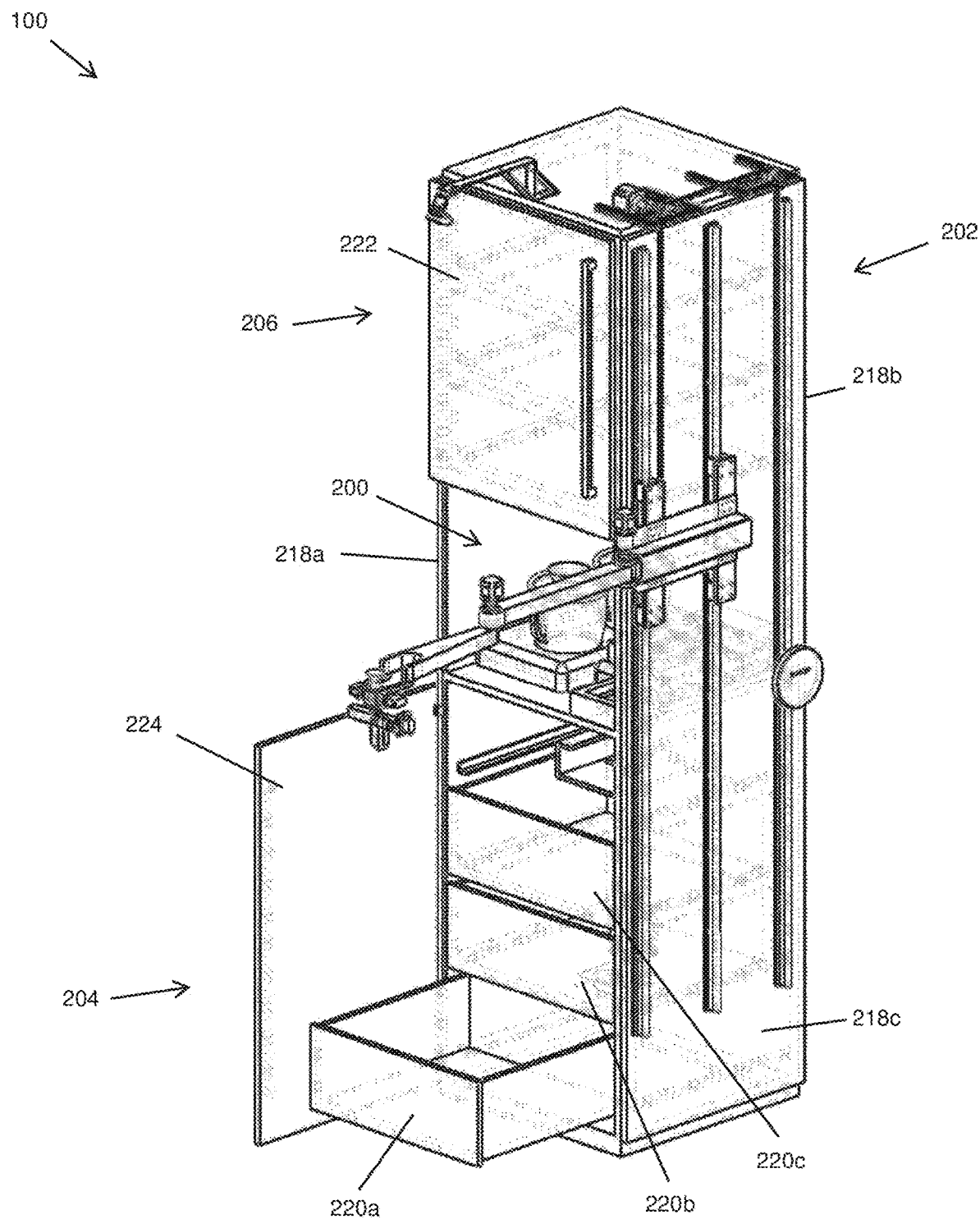
FIG. 3 is a perspective view of the system of FIG. 2 illustrating an upper and lower storage compartment comprising a plurality of drawers where the lower storage compartment is open and the collecting element is deployed.
Figure 4:
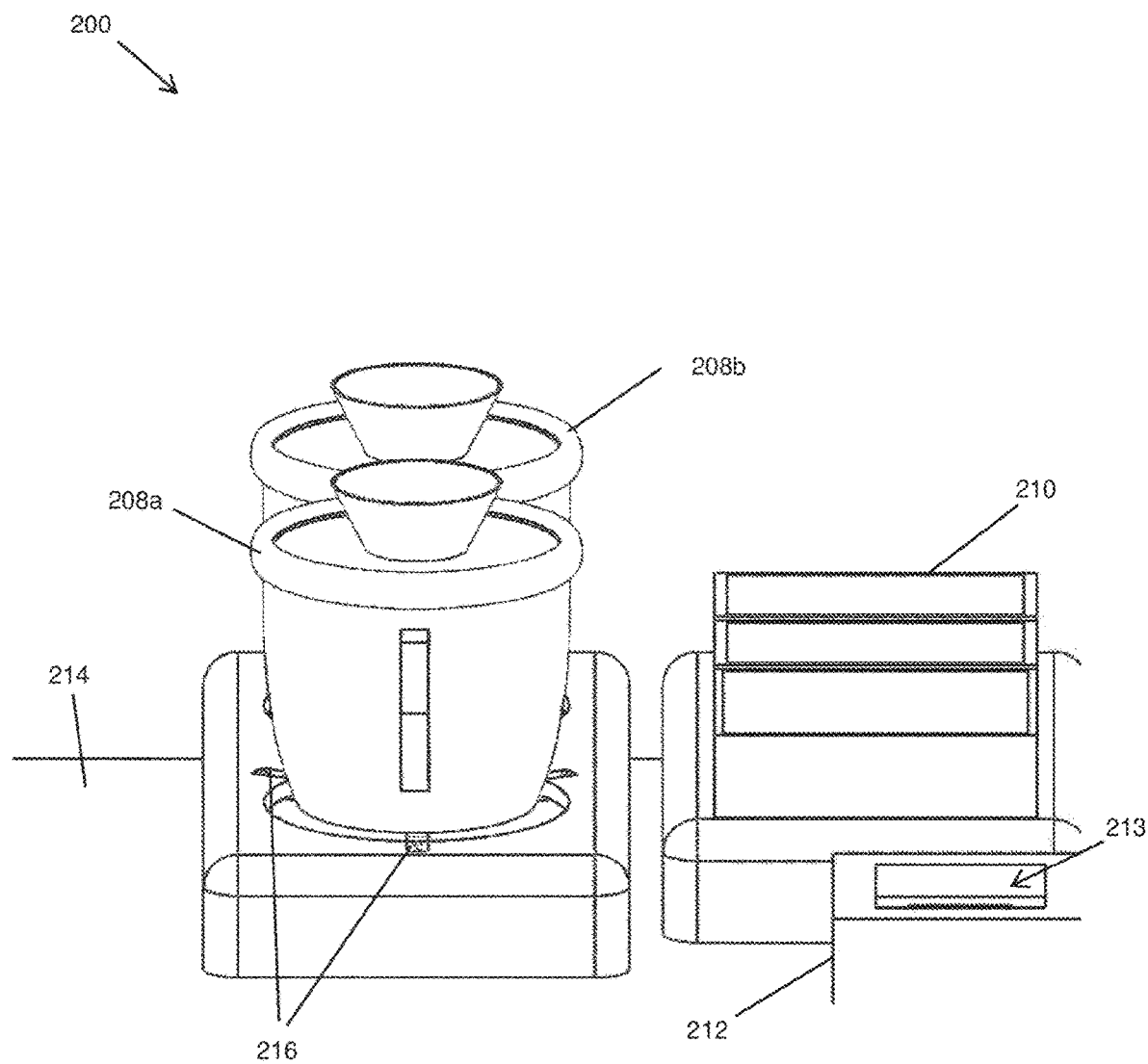
FIG. 4 is a perspective view for better showing the food processing unit of FIG. 2 comprising a plurality of cooking devices, a sous-vide cooker and a food container opening mechanism.

More precisely, referring to FIGS. 3 and 4, the food processing unit 200 is configured to perform a set of food preparation tasks such as mixing and cooking by following the steps of a selected recipe. The food processing unit 200 is located in a furniture unit 202 between a lower storage compartment 204 and an upper storage compartment 206 adapted to store the food containers.

In one embodiment illustrated in FIG. 4, the food processing unit 200 comprises two cooking devices 208a and 208b, a sous-vide cooker 210 and a food container opening mechanism 212 disposed on a horizontal wall 214. The food processing unit 200 is adapted to prepare meals according to a selected recipe or according to the available ingredients of the food containers located in the vicinity of the system 100, as it will be explained further. It will be appreciated that the sous-vide cooker 210 is an embodiment of a water cooker. A water cooker may be used to perform one of a regular cooking task and a sous-vide food preparation task.

In one embodiment, at least one cooking device of the cooking devices 208a and 208b is a multifunctional cooking device.

In one embodiment, the food container opening mechanism 212 comprises a cavity 213 having a complementary shape of a food container. As it will be discussed in further detail below, the cavity 213 is adapted to receive and maintain a food container while the grabbing member 600 rotates and removes its lid before dispensing the ingredients thereof in the cooking devices 208a and/or 208b.

In one embodiment, the cooking devices 208a and 208b may comprise load cells 216 located thereunder. The load cells 216 are adapted to precisely weigh the ingredients as they are poured in the cooking devices 208a and 208b. The load cells 216 may be remotely connected to the control system 500 and enable the system 100 to precisely follow the recipe's instruction concerning the dosage of ingredients and according to the number of meals to be prepared.

In an alternative embodiment, other devices may be used for measuring the quantity of ingredients dispensed from the food containers in the cooking devices 208a and/or 208b. For instance, according to the shape of the food container, the control system 500 may calculate how to angle the food container to dispense a certain quantity of ingredients. Furthermore, the food processing unit 200 may comprise vision capabilities to estimate the dispensed quantity of ingredients from the food containers into the cooking devices 208a and/or 208b.

It will be understood by a person skilled in the art, that the food processing unit 200 may comprise more than two cooking devices 208a and 208b. Moreover appliances such as a steam cooker, a fryer, a pressure cooker, etc., may also be provided in the food processing unit 200.

In one embodiment, the sous-vide cooker 210 comprises a temperature controlled water basin adapted to receive vacuum-sealed ingredients such as the sous-vide bags previously mentioned, as a skilled addressee will appreciate.

In one embodiment, shown in FIG. 3, the furniture unit 202 has a rectangular box shape and comprises upper and lower storage compartments 206 and 204, respectively, between its lateral walls 218a, 218b and 218c.

In one embodiment, each storage compartment comprises a plurality of drawers adapted to house the plurality of food containers. For instance, the lower storage compartment 204 comprises drawers 220a, 220b and 220c. It will be appreciated, by the skilled addressee, that the drawers 220a, 220b and 220c are operatively engaged in rails for sliding in and out of the lower storage compartment 204.

The upper storage compartment 206 is located above the food processing unit 200 and is provided with a plurality of drawers for housing a plurality of food containers. The drawers may also be engaged in rails for sliding in and out of the upper storage compartment 206.

In one embodiment, the upper and lower storage compartments 206 and 204, respectively, may comprise a different number of drawers for storing a different number of food containers. Furthermore, each drawer may be divided into a plurality of sections (not shown), each section adapted to receive a given food container. In this embodiment, each drawer of the upper and lower storage compartments 206 and 204 may comprise a grid structure to better accommodate the position of each food container stored therein.

In one embodiment, each of the upper and the lower storage compartments 206 and 204, respectively, comprises a hinged door 222 and 224 to provide access to the plurality of drawers and therefore to the plurality of food containers housed therein.

In an alternative embodiment, the doors 222 and 224 may be sliding doors.

In an alternative embodiment, the upper and the lower storage compartments 206 and 204 do not comprise doors.

In another embodiment, the food processing unit 200 may be located elsewhere in the vicinity of the system 100, such as on a counter. In this configuration, the food containers may be stored in another furniture unit such as in food cabinets or on shelves located in the vicinity of the system 100.

Figure 5:
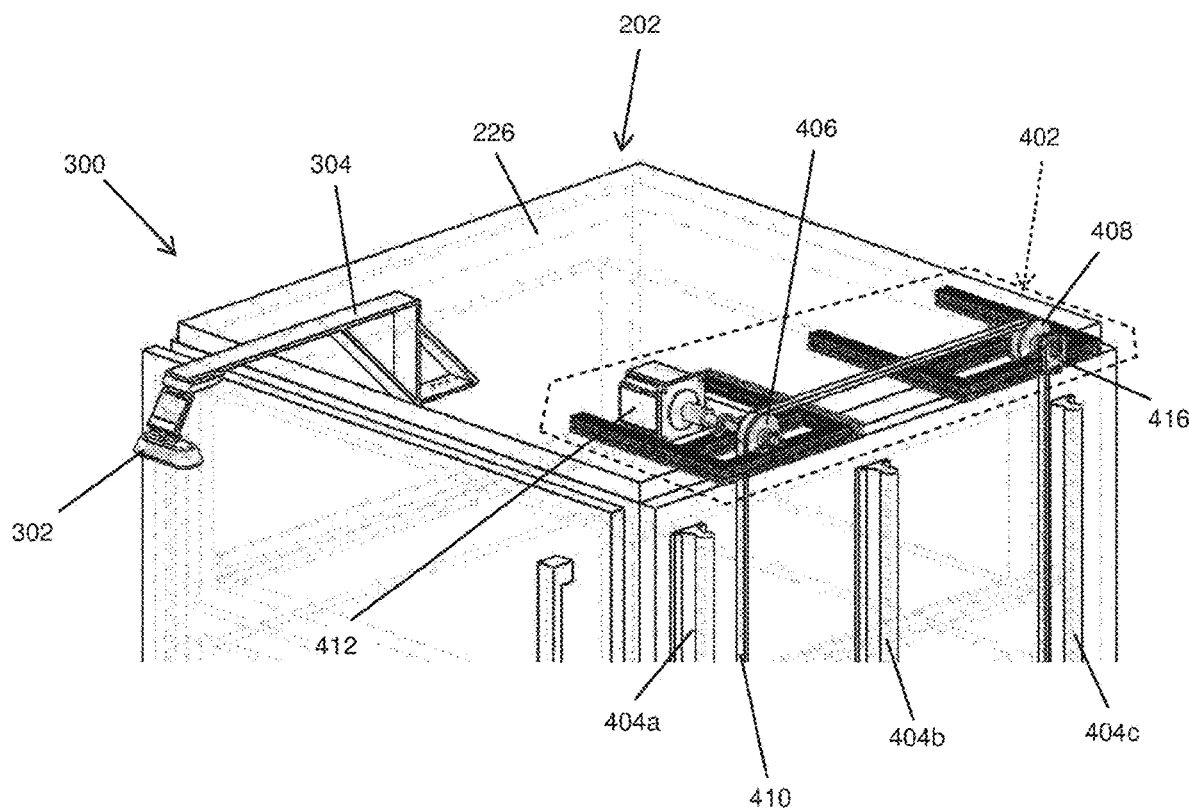
FIG. 5 is a top perspective view for better showing the identification unit and a moving mechanism, according to one embodiment.
Figure 6:
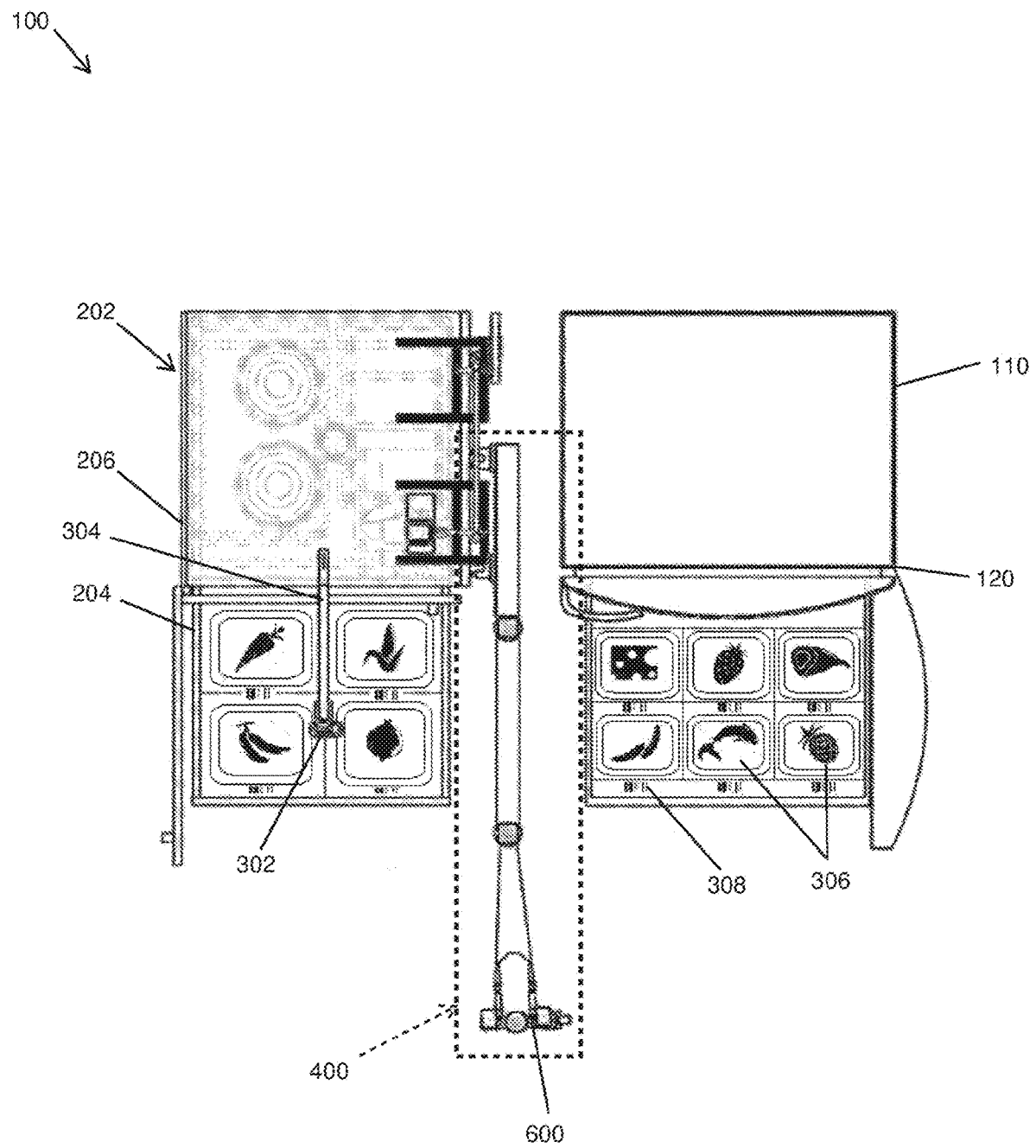
FIG. 6 is a top view of the system illustrating food containers stored in drawers of a furniture unit and a freezer, the food containers comprising identification means.
Figure 7:
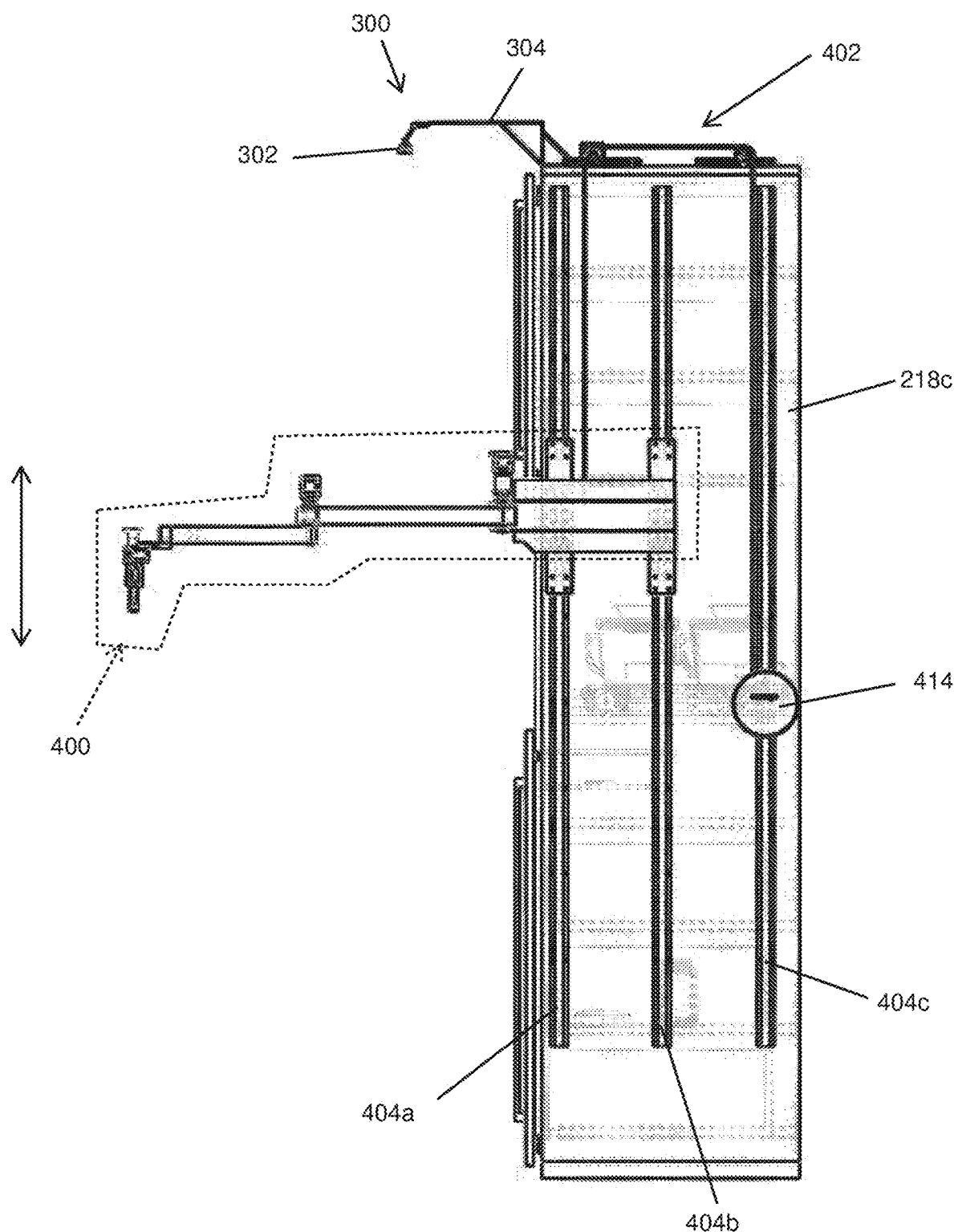
FIG. 7 is a right side view of the system for better illustrating the moving mechanism, according to one embodiment.

Referring now to FIGS. 5 to 7, the identification unit 300 is adapted to identify the food containers located in the vicinity of the system 100.

In one embodiment, the identification unit 300 comprises an identification camera 302 coupled to a computer vision software for identifying food containers. The identification camera 302 is connected to a support 304 and is configured to identify the graphic element such as the standardized icons 306 or text located on each food container. A computer vision software in collaboration with the control system 500 is configured to process the signals generated by the identification of the food container.

In an alternative embodiment, the camera 302 is configured to scan the SKU barcodes 308, the QR codes or the RFID tags associated with each food container and identify a selected food container to provide the control system 500 with information such as the type of ingredient stored in the food container, the quantity of the given ingredient, the date of expiry of the ingredient according to the purchase date, etc.

In one embodiment, the standardized icons 306 are icons of ingredients.

In one embodiment, the simple text may be a word or group of words defining the ingredients located in the food container.

A person skilled in the art will appreciate that other identification means may be contemplated, without departing from the scope of the invention.

In one embodiment, the information provided to the control system 500 by the identification unit 300 is stored and enables the collecting element 400 to grab the suitable food container according to the selected recipe, as it will be further explained below.

In the illustrative embodiment of FIG. 5, the support 304 is secured onto top wall 226 of the furniture unit 202 by conventional securing means, although other locations may be contemplated. In this embodiment, the support 304 extends away from the furniture unit 202 for enabling the identification camera 302 to identify a selected food container stored in drawers of the upper or lower storage compartments 206 and 204, as the drawers are pulled out.

In one embodiment, the identification camera 302 has an obround shape and faces vertically down towards the upper and lower storage compartments 206 and 204, as shown in FIG. 7. The identification camera 302 is adapted to laterally scan from one side of a drawer to the other side thereof the identification means of the plurality of food containers located therein when a drawer is pulled out.

In one embodiment, the identification unit 300 is able to identify food containers located in the fridge 110 and/or the freezer 120.

In an alternative embodiment, the identification camera 302 is an SKU barcode scanner or RFID scanner.

In one embodiment, as a food container is removed or placed in a drawer of the furniture unit, in the fridge 110 or in the freezer 120, the identification camera 302 establishes a record of the actual up-to-date inventory. The identified information of the identification camera 302 is then transmitted to the control system 500 which processes the information, as will be explained below.

In an alternative embodiment, the identification unit 300 may comprise a plurality of identification cameras similar to identification camera 302 to better accommodate an increased number of food containers.

Referring now to FIGS. 5 and 7 to 12, the collecting element 400 is configured to collect a selected given food container of either the plurality of food containers located in a vicinity of the collecting element 400 or from another plurality of food containers located in a fridge 110 and/or freezer 120 located in a vicinity of the collecting element 400.

In one embodiment, the collecting element 400 collects the selected given food containers located in the plurality of drawers of the upper and lower storage compartments 206 and 204 of the furniture unit 202 and transports them to the food processing unit 200.

In one embodiment, each of the fridge 110 and/or the freezer 120 may comprise a linear actuator adapted to open the door thereof for enabling the collecting element 400 to grab a given food container.

In one embodiment, the collecting element 400 is adapted to be vertically moved up and down along a vertical axis, as shown by the vertical arrow in FIG. 7.

In an alternative embodiment, the collecting element 400 may be moved up and down along a slightly inclined axis.

More precisely, a moving mechanism 402, best shown in FIG. 5, is adapted to convey, either upwardly or downwardly the collecting element 400 along a set of vertical rails 404*a* and 404*b*. The moving mechanism 402 comprises a driver pulley 406, an idler pulley 408 and a timing belt 410, the timing belt 410 removably connected to the collecting element 400.

In one embodiment, the driver pulley 406 is actuated by a stepper motor 412 (hereinafter motor 412) for moving the timing belt 410 and therefore the collecting element 400. The idler pulley 408 is connected to a counter weight 414, see FIG. 7, attached to the timing belt 410 to relieve the torque requirement from the motor 412.

In one embodiment, the motor 412 is a NEMA® 23 CNC stepper motor and is actuated by the control system 500. Furthermore, as a skilled addressee will appreciate, the motor 412 may comprise a planetary gearbox having a specified gear ratio for conveying the timing belt 410 at a specific speed.

Alternatively, a skilled addressee will appreciate that other motors may be contemplated for different practical reasons such as rotational speed of the shaft or the torque available.

In one embodiment, the idler pulley 408 comprises an encoder 416 for detecting the position of the timing belt 410 as it travels up and down. The encoder 416 is configured to send a feedback signal to the control system 500 to provide the position of the collecting element 400 thereto.

In an alternative embodiment, the moving mechanism 402 may comprise an encoder (not shown) configured to read the position of the collecting element 400 on the vertical axis.

In one embodiment, as the idler pulley 408 is rotated, the counter weight 414 is moved upwardly or downwardly along vertical rail 404*c*, in the opposite direction of the collecting element 400. The counter weight 414 is configured to counterbalance the weight exerted by the collecting element 400 on the motor 412 in order to minimize the torque requirement by the motor.

In the embodiment shown in FIG. 7, the moving mechanism 402 is located on the lateral wall 218*c* of the furniture unit 202.

In another embodiment, the moving mechanism may be located on either lateral walls 218*a* or 218*b* of the furniture unit 202 or elsewhere while still providing a vertical movement of the collecting element 400.

In another embodiment, the collecting element 400 may be moved up and down by any other suitable moving mechanism such as a rack-and-pinion mechanism or the like.

The collecting element 400 is adapted to collect a selected given food container from either the vicinity thereof, the plurality of drawers of the furniture unit 202, the fridge 110 and/or the freezer 120 by way of a grabbing member 600.

Figure 8:
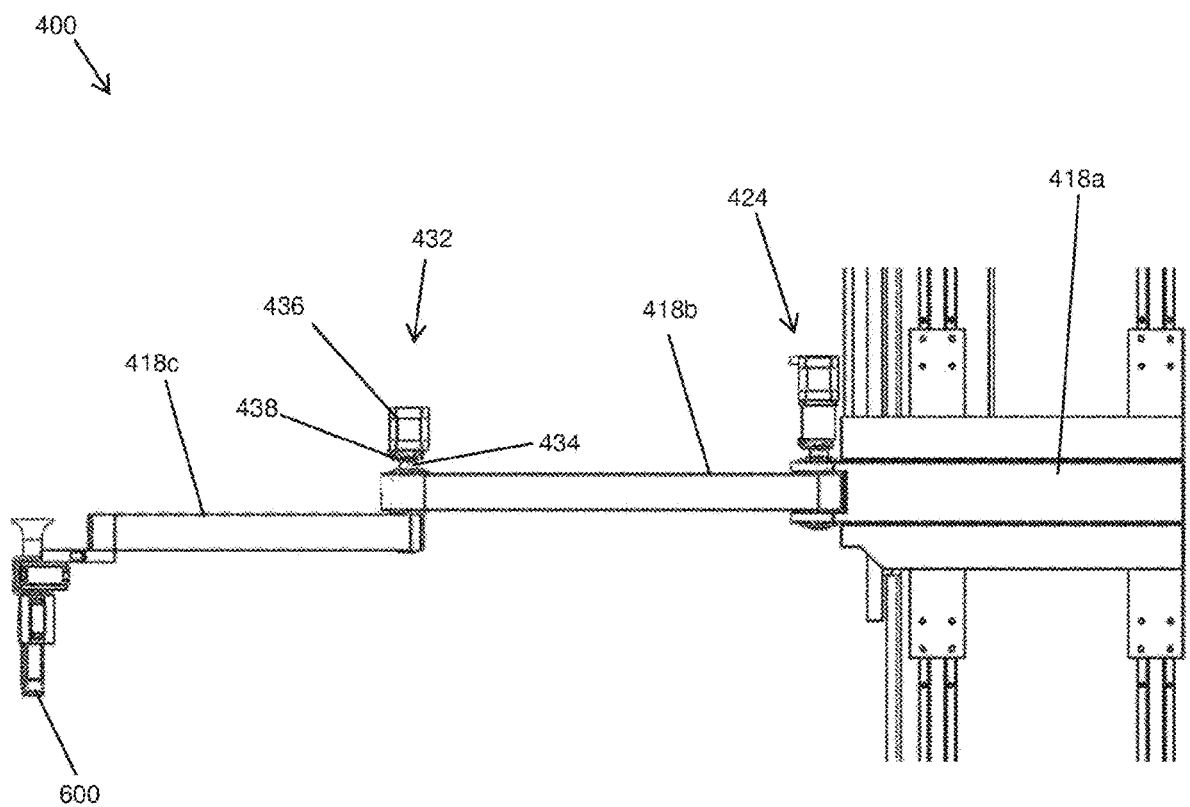
FIG. 8 is a right side view illustrating the collecting element comprising a proximal member, an intermediate member and a distal member, the distal member comprising a grabbing member, according to one embodiment.

In one embodiment, shown in FIG. 8, the collecting element 400 comprises a proximal member 418*a*, an intermediate member 418*b* and a distal member 418*c*, wherein the intermediate and distal members 418*b* and 418*c* are adapted to be pivoted.

Figure 9:
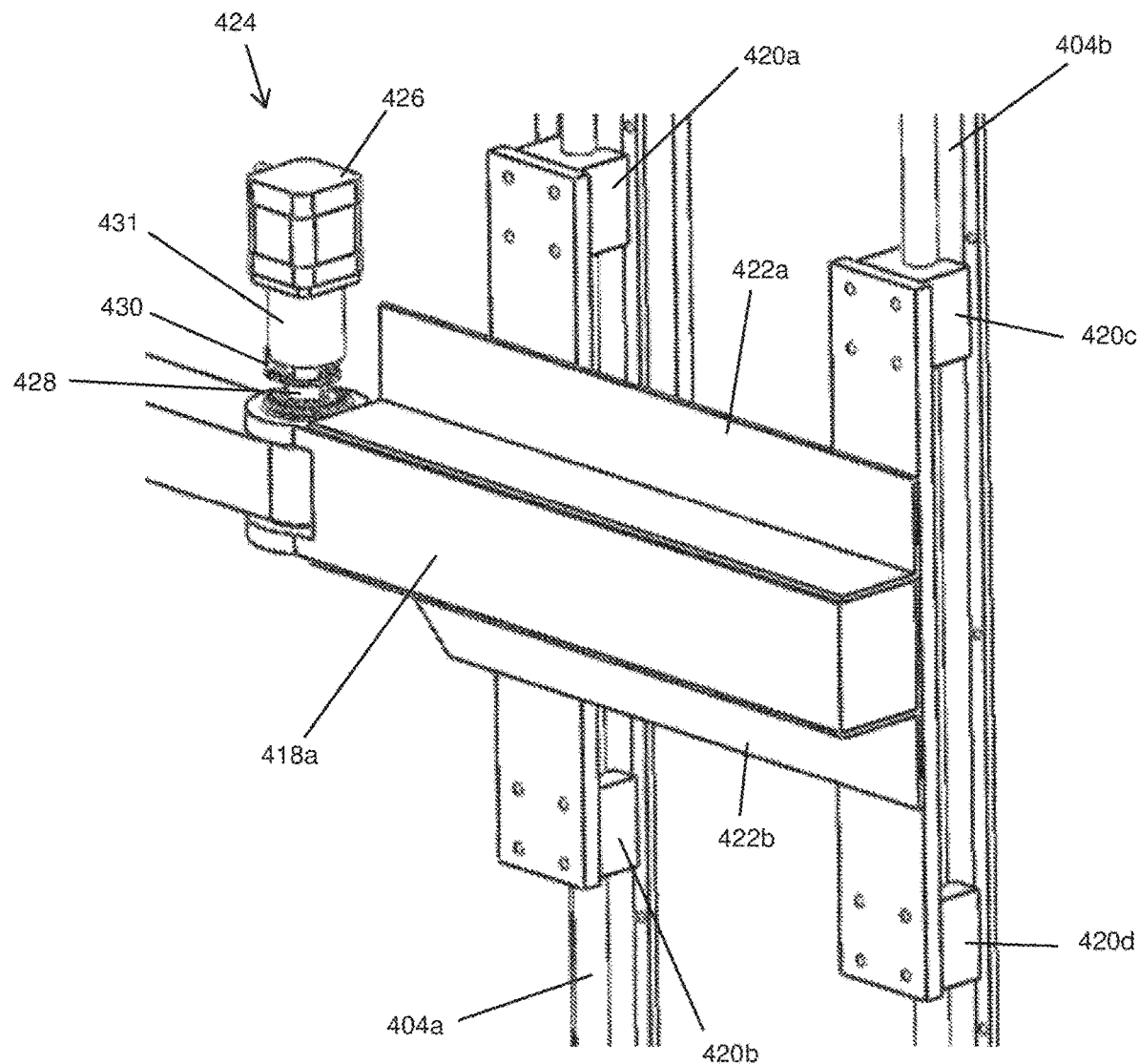
FIG. 9 is a perspective view for better illustrating the proximal member of the collecting element attached to the moving mechanism, according to one embodiment.

More precisely, as best shown in FIGS. 8 and 9, the proximal member 418*a* has a rectangular box shape and is connected to the moving mechanism 402 by four linear bearing 420*a*, 420*b*, 420*c* and 420*d*. The bearings 420*a*, 420*b*, 420*c* and 420*d* enable a smooth vertical movement of the collecting element 400 on rails 404*a* and 404*b*. The proximal member 418*a* further comprises a pair of L-plates 422*a* and 422*b* for attaching to the timing belt 410 and for providing structural strength to the proximal member 418*a*.

In one embodiment, the proximal member 418*a* further comprises a first joint 424 adapted to connect to the intermediate member 418*b*. The first joint 424 comprises a first encoder 430, a first stepper motor 426 to rotate the intermediate member 418*b* by way of a shaft 428 and a gear box 431. During actuation of the first stepper motor 426, the first encoder 430 is adapted to send feedback data and up-to-date information on the rotation of the shaft 428 to the control system 500. That data provides information such as the rotating speed, the rotating angle of the shaft 428 and the position of the intermediate member 418*b*. This enables the control system 500 to manage the displacement of the collecting element 400 for grabbing a selected food container.

The collecting element 400 further comprises the intermediate member 418*b* connected to the proximal member 418*a* at the first joint 424 and to the distal member 418*c* at a second joint 432. The intermediate member 418*b* is adapted to be rotated by the first joint 424 as previously explained to position the collecting element 400 to grab a selected food container.

Similarly to the first joint 424, the second joint 432 comprises a shaft 434, a second stepper motor 436 and a second encoder 438. The second joint 432 is adapted to rotate the distal member 418*c* relative to the intermediate member 418*b*.

As for the first joint 424, the second stepper motor 436 is adapted to rotate the shaft 434 and therefore the distal member 418*c*. The second encoder 438 is adapted to send feedback data and up-to-date information on the rotation of the shaft 434 to the control system 500. That data therefore provide the control system 500 with the position of the distal member 418*c*, the rotating speed and the rotating angle of the shaft 434. This enables the control system 500 to manage the displacement of the distal member 418*c* for grabbing a selected food container.

Although stepper motors 426 and 436 have been disclosed for the first joint 424 and the second joint 432, a skilled addressee will appreciate that other motors may be contemplated for different practical reasons such as rotational speed of the shaft or the torque available, without departing from the scope of the invention. For instance, the stepper motors 426 and 436 may be replaced by servo motors or gear motors.

In one embodiment, the first and second stepper motors 424 and 436 as well as the first and second encoders 430 and 438 are wired to the control system 500.

In an alternative embodiment, the first and second stepper motors 424 and 436 as well as the first and second encoders 430 and 438 may be wirelessly operated by the control system 500 using a short-range wireless communication protocol such as Wi-Fi or Bluetooth®. In this case, the steppers motors 424 and 426 are wired to a microcontroller and a driver to wirelessly communicate with the control system 500.

In an alternative embodiment, the first and second stepper motors 424 and 436 as well as the first and second encoders 430 and 438 may comprise batteries for supplying electrical power thereto.

As shown in FIG. 8, the collecting element 400 further comprises the distal member 418*c*. The distal member 418*c* is adapted to be rotated by the second joint 432 relative to the intermediate member 418*b*. The distal member 418*c* is connected to the second joint 432 and to the grabbing member 600 which is adapted to grab a selected given food container.

In an alternative embodiment, the collecting element 400 may comprise a Cartesian coordinate arm (not shown) having a plurality of linear connections, each actuated by a linear actuator. In this embodiment, the collecting element 400 may be moved up and down by a first linear actuator along a vertical or slightly vertical axis. The collecting element 400 is then adapted to grab a given food container thanks to the plurality of linear actuators accommodating the different grabbing distances in a horizontal plane perpendicular to the vertical axis.

Figure 10:
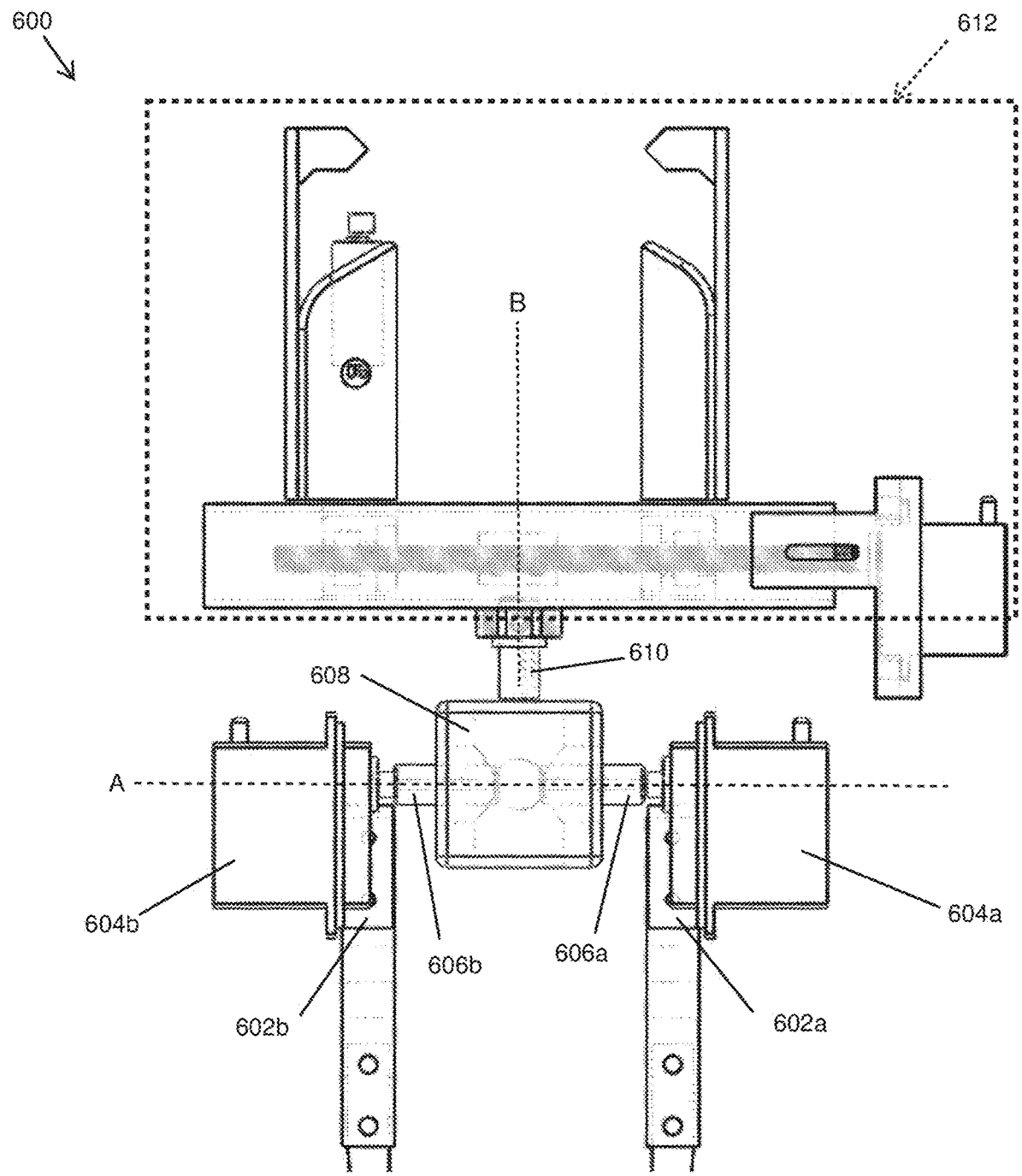
FIG. 10 is a top view of the grabbing member comprising a gripper assembly, according to one embodiment.
Figure 11:
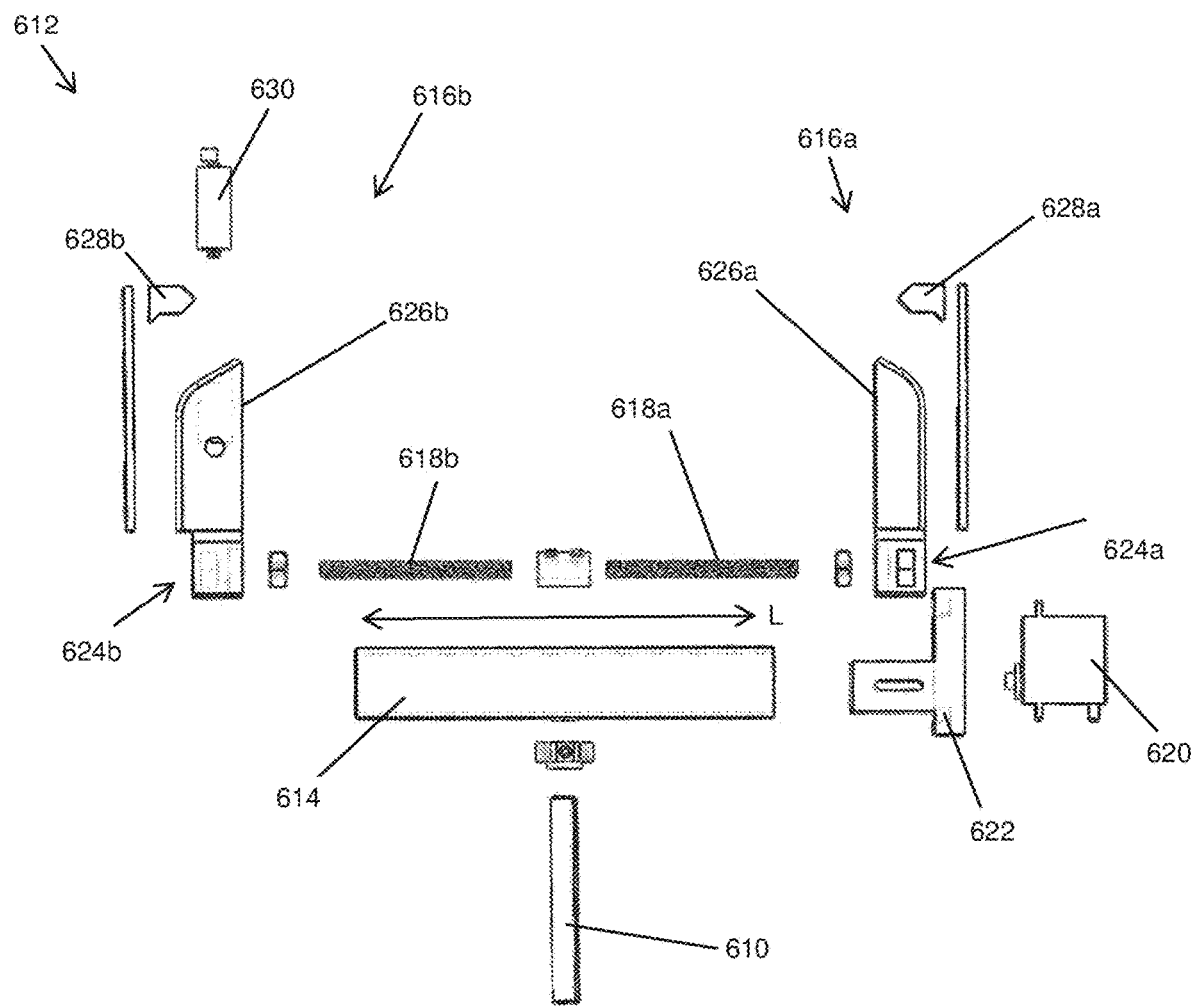
FIG. 11 is an exploded top view of the gripper assembly of FIG. 9, according to one embodiment.
Figure 12:
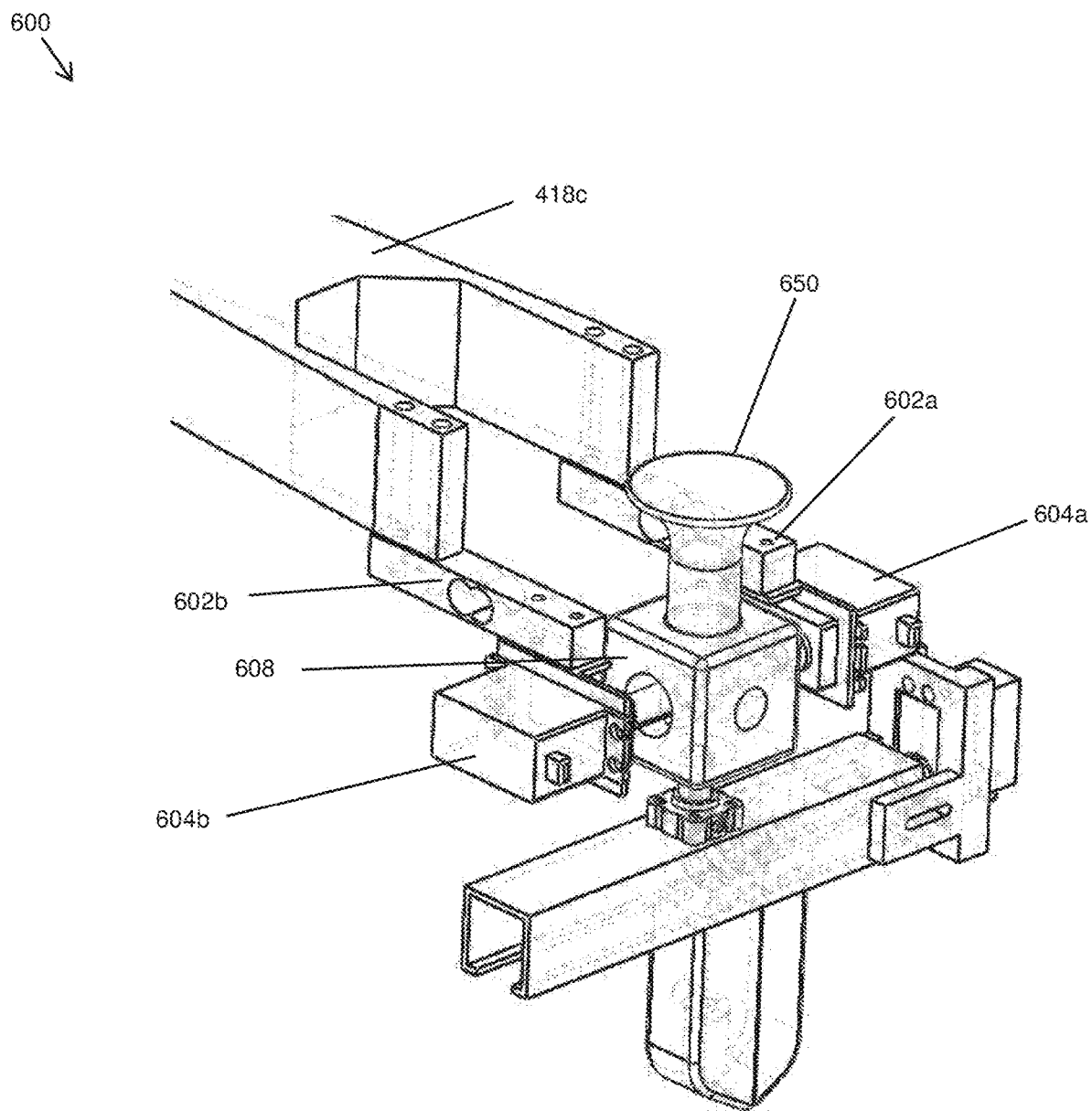
FIG. 12 is a perspective view of the grabbing member comprising a suction assembly.

Referring now to FIGS. 10 to 12, the grabbing member 600 comprises a pair of load cells 602a, 602b configured to measure the weight of a selected food container grabbed by the collecting element 400.

In an alternative embodiment, the load cells 602a and 602b may be located on any one of the proximal member 418a, intermediate member 418b or distal member 418c.

In one embodiment, the load cells 602a, 602b are strain gauge load cells adapted to create an electrical signal proportional to the weight deformation being measured. Alternatively, the load cells 602a, 602b may be piezoelectric load cells. It will be therefore appreciated that at least one of the collecting element 400 and the food processing unit 200 comprises at least one load cell for measuring a corresponding weight of an ingredient. Alternatively, the at least one load cell may be provided in a dedicated weighing station.

The grabbing member 600 further comprises a pair of servo motors 604a and 604b adapted to precisely control the angular position, speed and acceleration of a pair of shafts 606a and 606b coupling the servo motors 604a and 604b to a multi-level gear box 608 comprising a differential mechanism. In this embodiment, the servo motors 604a and 604b associated with the multi-level gear box 608 are adapted to rotate a gripper assembly 612 in a position for grabbing or releasing a selected food container, as it will be explained below.

In one embodiment, the servo motors 604a and 604b are connected to the control system 500.

In one embodiment, the pair of shafts 606a and 606b are rotated upon actuation by the control system 500 of their respective servo motors 604a and 604b for a precise control of their angular position, velocity and acceleration.

In one embodiment, the shafts 606a and 606b are rotated around a first rotation axis A for rotating a selected food container during dispensing of ingredients in the food processing unit 200.

The grabbing member 600 further comprises a shaft 610 linking the multilevel gear box 608 to the gripper assembly 612.

In one embodiment, the shaft 610 is configured to be rotated by the multilevel gear box 608 along a second rotation axis B, perpendicular to the first rotation axis A, for tilting the grabbed food container during dispensing of ingredients in the food processing unit 200.

In an alternative embodiment, although a multi-level gear box has been contemplated for rotating the gripper assembly 612 along the first and second rotation axis A and B, other configurations are possible without departing from the scope of the invention. For instance, a first linear actuator may be used to rotate the gripper assembly 612 along the first rotation axis A and a second linear actuator may be used to rotate the gripper assembly 612 along the second rotation axis B for rotating a selected food container during dispensing of ingredients in the food processing unit 200.

In one embodiment, the first and second linear actuators may be hydraulic or pneumatic actuators.

Referring now to FIG. 11, the gripper assembly 612 comprises a rail 614 adapted to receive a pair of grippers 616a, 616b, a pair of endless screws 618a, 618b engaged with grippers 616a, 616b, respectively, and a servo motor 620 adapted to rotate the pair of endless screws 618a, 618b for displacing the grippers 616a and 616b along the rail 614.

In one embodiment, the endless screws 618a and 618b are configured to transform a rotational movement induced by a servo motor 620 into a linear movement of the grippers 616a and 616b, along arrow L.

In an alternative embodiment, hydraulic or pneumatic actuators may be contemplated for providing a linear movement of the grippers 616a and 616b along arrow L.

In one embodiment, the threads of the endless screws 618a and 618b are in opposite directions for allowing the grippers 616a and 616b to either come closer or move away from each other as the servo motor 620 is actuated by the control system 500.

In one embodiment, the servo motor 620 is secured onto a bracket 622 which is fixedly attached to the rail 614. In this configuration, the servo motor 620 is aligned with the endless screws 618a and 618b.

The pair of grippers 616a and 616b are positioned facing each other along rail 614. Each gripper 616a and 616b comprises a first end 624a, 624b fitted in the rail 614 and a contacting surface 626a, 626b for contacting a selected food container as it is grabbed.

Each gripper 616a and 616b further comprises a food quality detector 628a and 628b configured to detect if the ingredient contained in the food container is expired.

The gripper 616b further comprises a vibrating motor 630 adapted to shake the grabbing member 600 in order to enable the pouring of the ingredient from the food container in the cooking devices 208a and 208b of the food processing unit 200.

In one embodiment, the vibrating motor is an eccentric rotating mass vibration motor (ERM).

In an alternative embodiment, the vibrating motor is a linear resonant actuator (LRA).

The pair of grippers 616a and 616b are adapted to be longitudinally displaced relative to each other, along the longitudinal axis of the rail 614 and describe the form of a clamp adapted to grab the selected food containers. As the servo motor 620 is actuated by the control system 500 to bring the grippers 616a and 616b closer, in a squeezing motion, the endless screws 618a and 618b are rotated in a first direction wherein grippers 616a and 616b are linearly moved towards the center of the rail 614 in a symmetrical fashion.

When the grabbing member 600 releases a selected food container, the pair of grippers 616a and 616b are separated from each other upon actuation of the servo motor 620 by the control system 500. In this case, the servo motor 620 rotates the pair of endless screws 618a and 618b in a second direction, opposite to the first direction, and the grippers 616a and 616b are linearly moved away from each other in a symmetrical fashion.

In one embodiment, the servo motors 604a, 604b and 620 as well as the vibrating motor 630, the food quality detectors 628a, 628b and the load cells 602a and 602b are wirelessly connected to the control system 500.

In one embodiment shown in FIG. 12, the grabbing member 600 comprises a suction assembly 650 adapted to grip flat surfaces such as sous-vide bags.

The suction assembly 650 has the shape of a suction cup and is connected to the multi-level gear box 608 at one end and to a tube (not shown) coupled to a vacuum unit (not shown) at a second end. In use, as flat surfaces such as sous-vide bags tend to be hard to grab by the grippers 616a and 616b, the suction assembly 650, in collaboration with the vacuum unit, enables the grabbing member 600 to grip a flat surface by providing a vacuum pressure. Therefore, as a selected sous-vide bag is identified by the identification unit 300, the control system 500 actuates the vacuum unit which in turns actuates the suction assembly 650 for grabbing the flat surface. As the suction assembly 650 tightly grips the sous-vide bag, the moving mechanism 402 displaces the collecting element 400 to the food processing unit 200 for delivering the sous-vide bag in the sous-vide cooker 210.

In an alternative embodiment, the grabbing member 600 may comprises other grabbing means such as a magnet for grabbing food containers, provided the food containers comprise a magnetized element.

In an alternative embodiment, the collecting element 400 may comprise a different number of members for accommodating the environment where the system 100 is installed. For example, differences in layouts may occur between a household kitchen and a restaurant kitchen and the collecting element 400 may therefore have an increased number of members in order to accommodate the spatial layout of a restaurant kitchen. In this configuration, each joint connecting consecutive members comprises a stepper motor, a shaft and an encoder for rotating the connected member, as previously explained. Moreover, a person skilled in the art will appreciate that other mechanical connections such as spherical connections between consecutive members may be considered.

In one embodiment, at least one of the proximal member 418a, the intermediate member 418b and the distal member 418c members 418a, 418b and 418c of the collecting element 400 is longitudinally extendable and is able to accommodate a plurality of distances in order to grab selected food containers in the vicinity thereof In an alternative embodiment, linear actuators such as hydraulic or pneumatic actuators may be contemplated for rotating the consecutive connected members of the collecting element 400.

Figure 13:
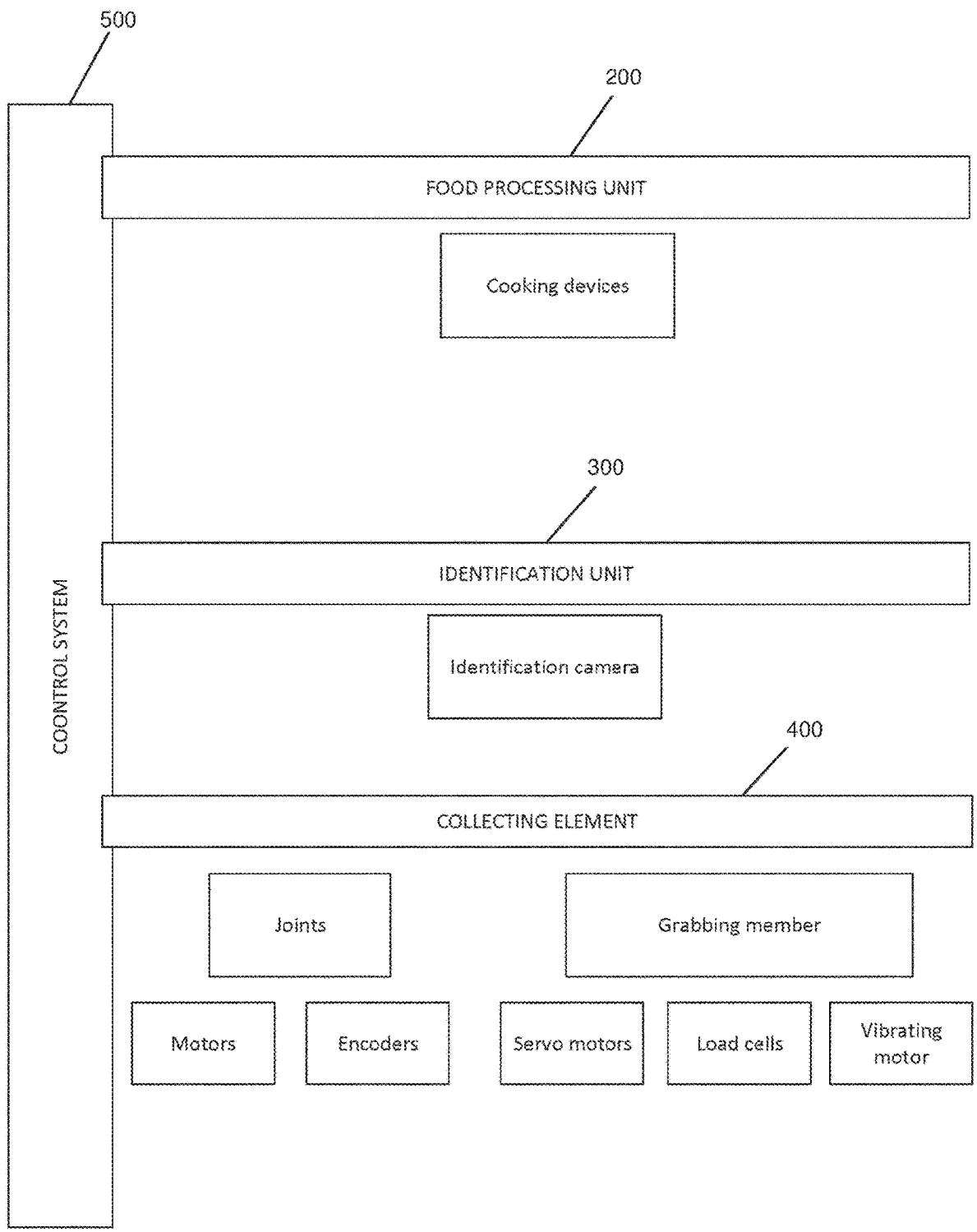
FIG. 13 illustrates the different components of the system to which the control system is operatively connected.

With reference to FIG. 13, the control system 500 is adapted to manage the preparation and the cooking of meals and is operatively connected to the food processing unit 200, to the identification unit 300 and to the collecting element 400.

More precisely, the control system 500 is configured to operatively control the different motors 412, 426, 436, the servo motors 604a, 604b and 620 as well as the vibrating motor 630 for operating the system 100. The plurality of encoders 416, 430 and 438, located on the shafts of the plurality of motors, provide an up-to-date movement status of the collecting element 400 by sending feedback data to the control system 500. Moreover, the control system 500 receives information from the identification unit 300 and from the load cells 602a and 602b for providing an up-to-date inventory of the system 100, as it will be explained below.

In one embodiment, the control system 500 is operated via a user interface (not shown) to enable a user to interact with the system 100 either when the user is in the vicinity of the system 100 or away from the system 100. The user interface comprises a touchscreen, a voice recognition software and an application platform.

The touchscreen may be located either on the furniture unit 202 or in the vicinity of the system 100. The user therefore provides inputs on the touchscreen to send instructions to the system 100 for the food preparation. Alternatively, the touchscreen may be located elsewhere and allows the user to provide the system 100 the instructions for the preparation of a recipe remotely.

The user interface may further enable a user to interact with the system 100 through a voice recognition software.

In one embodiment, a microphone may be implemented on the furniture unit 202 of the system 100 for allowing a user to provide instructions to the system 100.

In one embodiment, the application platform enables the instructions provided by the user using the touchscreen or the microphone to be sent to the control system 500.

In one embodiment, the application platform enables a user to remotely provide instructions to the control system 500 regarding the food preparation. The application platform may be executed on any portable device such as a smartphone, a tablet or a laptop. In this configuration, the user may provide instructions to the control system 500. Furthermore, the voice recognition software may be implemented on the smartphone, the tablet or the computer for enabling a user to provide instructions to the system 100 wirelessly.

In an alternative embodiment, a keyboard may be provided either in the vicinity of the system 100 or remotely therefrom for enabling a user to provide instructions to the control system 500 concerning the food preparation. For instance, the keyboard may be provided on the furniture unit 202.

In one embodiment, the control system 500 is wiredly connected to the user interface.

In an alternative embodiment, the control system 500 is wirelessly connected to the user interface using a short-range wireless communication protocol such as Wi-Fi or Bluetooth®, as a skilled addressee will appreciate.

In one embodiment, the control system 500 is connected to the Internet.

Figure 14:
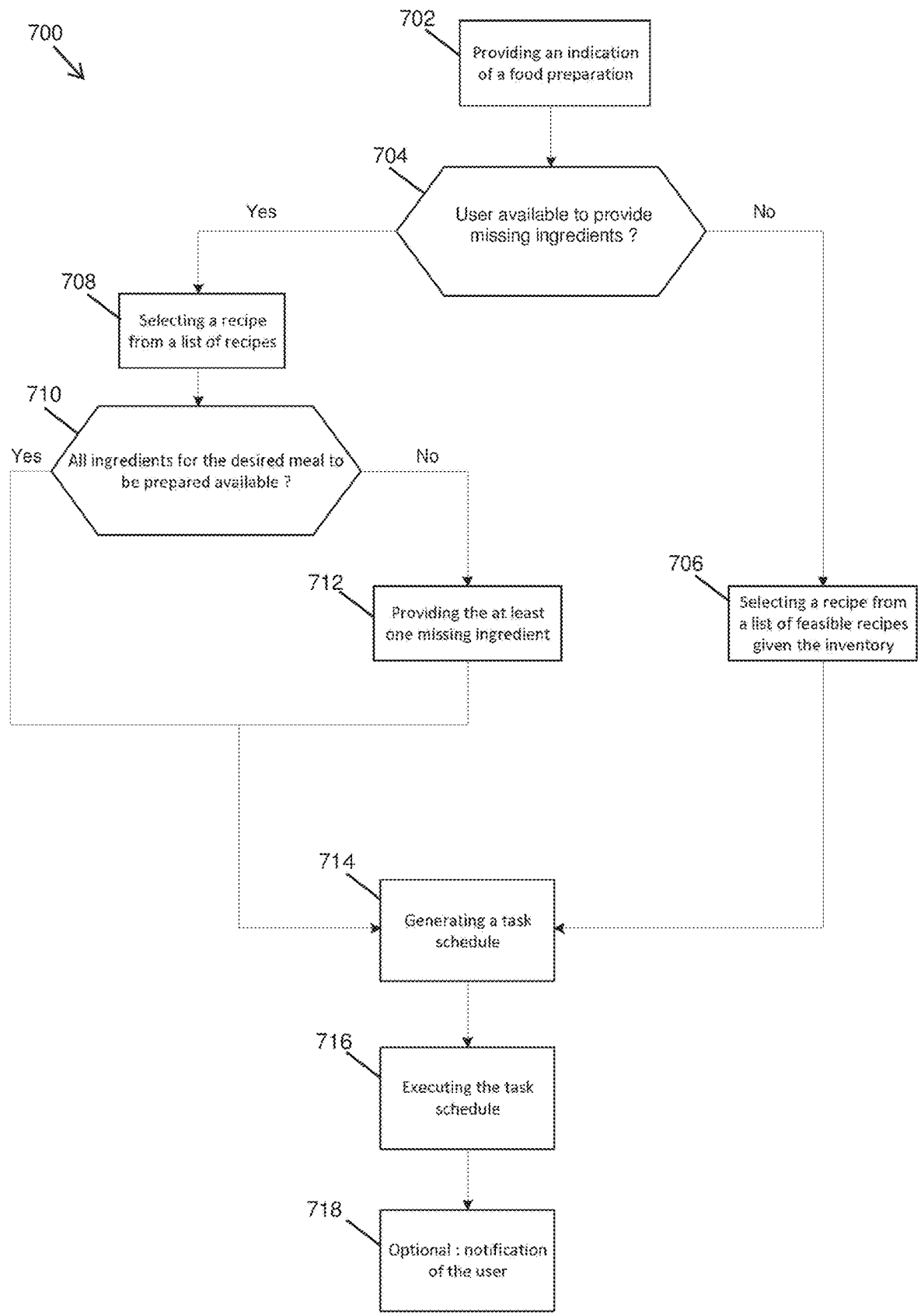
FIG. 14 is a block diagram of a method for automatically preparing food according to a selected recipe.

Now referring to FIG. 14, there is shown an embodiment of a method 700 for automating the preparation of food according to the present invention.

According to processing step 702, a user provides an indication of a food preparation.

The user interacts with the system 100 for providing information on a food preparation by using the touchscreen, the microphone or wirelessly by using a smartphone, a tablet or a laptop. The user provides a set of information to the control system 500 such as the type of food he wants to eat, at what time the meal should be ready and how many guests are going to be present. The user may provide food allergies and/or dietary restrictions.

In one embodiment, the user may provide keywords to the user interface according to a meal he wants to eat, such as the type of cuisine, taste preferences, dietary restrictions, etc.

According to processing step 704, the control system 500 determines the availability of a user to provide the missing ingredients of a selected recipe if needed. It will be appreciated that the user may interact with the system 100 either through the touchscreen, the microphone or wirelessly by using a smartphone, a tablet or a laptop to inform on his availability to provide the missing ingredients if required.

In the case where the user is not available to provide the at least one missing ingredient, according to processing step 706, the control system 500 displays at least one feasible recipe given the inventory 900 of the system 100, from which the user makes a choice.

In an alternative embodiment, the user may enable the control system 500 to randomly select a recipe without the user's input. In this case, the control system 500 randomly selects a recipe from the feasible recipes given the inventory 900 of the system 100.

In the case where the user is available to provide the missing ingredients, at processing step 708, the user selects a recipe from a list of all recipes generated by the control system 500.

Figure 15:
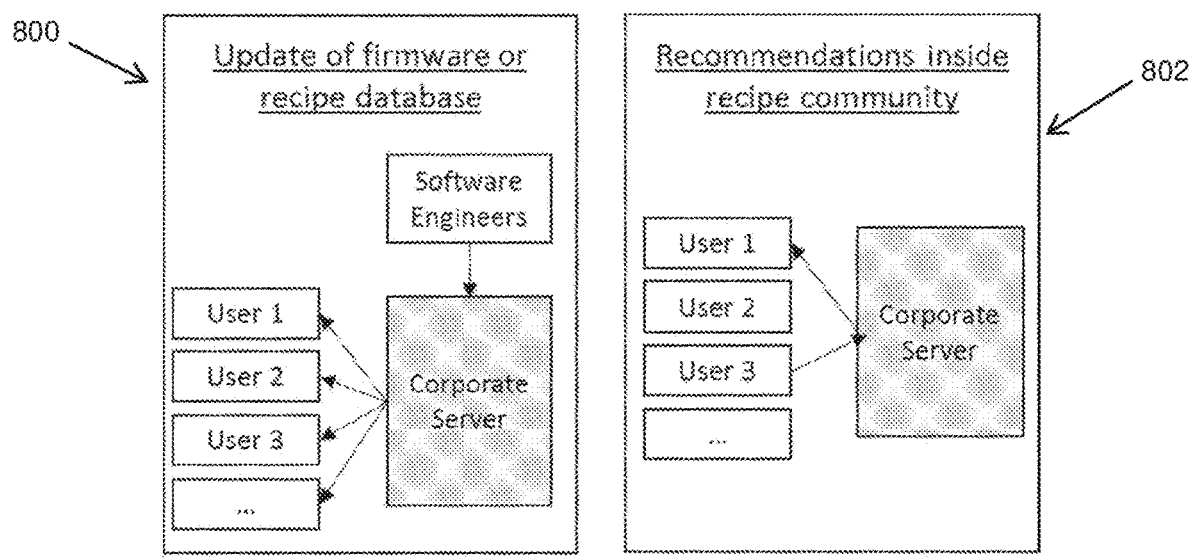
FIG. 15 illustrates the communication between the system and a recipe database and a recipe community.

In one embodiment, according to the keywords provided at processing step 702 of the method 700, the control system 500 provides different choices of recipes such as Asian cuisine, Mexican cuisine, Italian cuisine, French cuisine, etc, according to a recipe database 800 (see FIG. 15).

In an alternative embodiment, the control system 500 provides meal recommendations based on previous meals.

In an alternative embodiment, the control system 500 establishes a meal plan based on the user's profile.

In an alternative embodiment, the control system 500 randomly selects a recipe without the user's input.

In one embodiment, the recipes generated by the control system 500 are displayed on the touchscreen of the system 100.

In another embodiment, the recipes generated by the control system 500 are displayed on the smartphone, tablet or laptop of the user via the application platform.

According to processing step 710, a test is performed to determine if all the ingredients required for the selected recipe to be prepared are available.

According to the selected recipe and the number of meals to be prepared, the control system 500 evaluates if the desired recipe is feasible considering the ingredients available. As it will be explained below, an inventory 900 is established once by the control system 500 for all the food containers and is then updated at each modification thereof.

In one embodiment, the inventory 900 is established as the food containers are initially stored in the furniture unit 202, the fridge 110 and the freezer 120.

In one embodiment, the inventory 900 is updated when the user provides the food containers of the missing ingredients in the vicinity of the system 100 and the collecting element 400 stores the food containers in the furniture unit 202, the fridge 110 or the freezer 120. The control system 500 actuates the identification camera 302 and the collecting element 400 to grab and transport the food containers to be identified under the identification camera 302. The identification camera 302 identifies the identification means 306 located on the food containers and the load cells 602a and 602b of the grabbing member 600 determine the weight of the food containers for providing the control system 500 with the necessary information for the inventory 900. The food containers are then stored in the furniture unit 202, the fridge 110 or the freezer 120.

In a second embodiment, the inventory 900 is updated as the ingredients of the food containers of a selected recipe are dispensed.

In a third embodiment, the inventory 900 is updated when the user manually refills the food containers of the missing ingredients in the furniture unit 202, the fridge 110 or the freezer 120.

In the case where the system 100 evaluates that at least one ingredient of the selected recipe is missing, at processing step 712, the control system 500 provides the user a list of the at least one missing ingredient that needs to be provided for preparing the selected recipe.

In one embodiment, the control system 500 displays the at least one missing ingredient with its name, its quantity and its weight on the touchscreen or on the smartphone, the tablet or the laptop of the user.

According to processing step 714, the control system 500 generates a task schedule 1000.

Figure 17:
FIG. 17 is an example of a task schedule generated by the control system for a selected recipe.

Referring to FIG. 17, an exemplary task schedule 1000 is shown and comprises at least one step for preparing and cooking the selected recipe at the desired time and for the desired number of people. The task schedule 1000 further specifies the time for completing the at least one step, the at least one ingredient required to prepare the recipe, the cooking devices needed, etc.

According to processing step 716, the control system 500 executes the task schedule 1000 previously generated. The food preparation is therefore performed by the control system 500 actuating the food processing unit 200, the collecting element 400 and the identification unit 300. The collecting element 400 is displaced to grab, transport and dispense the ingredient from at least one food container in at least one of the cooking devices 208a and 208b or the sous-vide cooker 210 of the food processing unit 200. The food processing unit 200 is actuated to cook the ingredients by following the task schedule 1000 regarding the time of cooking, stir speed, heating temperature, quantity of ingredients to be dispensed, etc.

According to optional processing step 718, the control system 500 may send a notification to the user via the user interface to inform the user that the desired meal is cooked.

In one embodiment, the notification is provided via the touchscreen.

In an alternative embodiment, the notification is provided via the smartphone, the tablet or the laptop of the user.

Referring back at processing step 702 of the method 700, the control system 500 is connected through the Internet to a recipe database 800 where a great number of recipes are listed. Furthermore, the control system 500 may suggest certain recipes to the user based on his keywords and on recommendations of a recipe community 802 linked to the recipe database 800, as shown in FIG. 15. For example, as the user enters keywords via the user interface, a list of recipes is generated from the recipe database 800 and the recipes are graded by other users via the recipe community 802. Therefore, the user may decide whether or not a recipe has received good recommendations and whether or not he will try it. The recipe database 800 may also be updated by other users from the recipe community 802 by adding and/or modifying recipes.

In an alternative embodiment, the control system 500 may generate randomized meal schedules automatically based on the user's profile and his preferences.

Referring back at processing step 710 of method 700, according to the inventory 900 of the system 100, the control system 500 determines if all the ingredients for the selected recipe are available.

In the case that at least one ingredient is missing, information on the at least one missing ingredient is provided to the user, as shown at processing step 712 of method 700.

Figure 16:
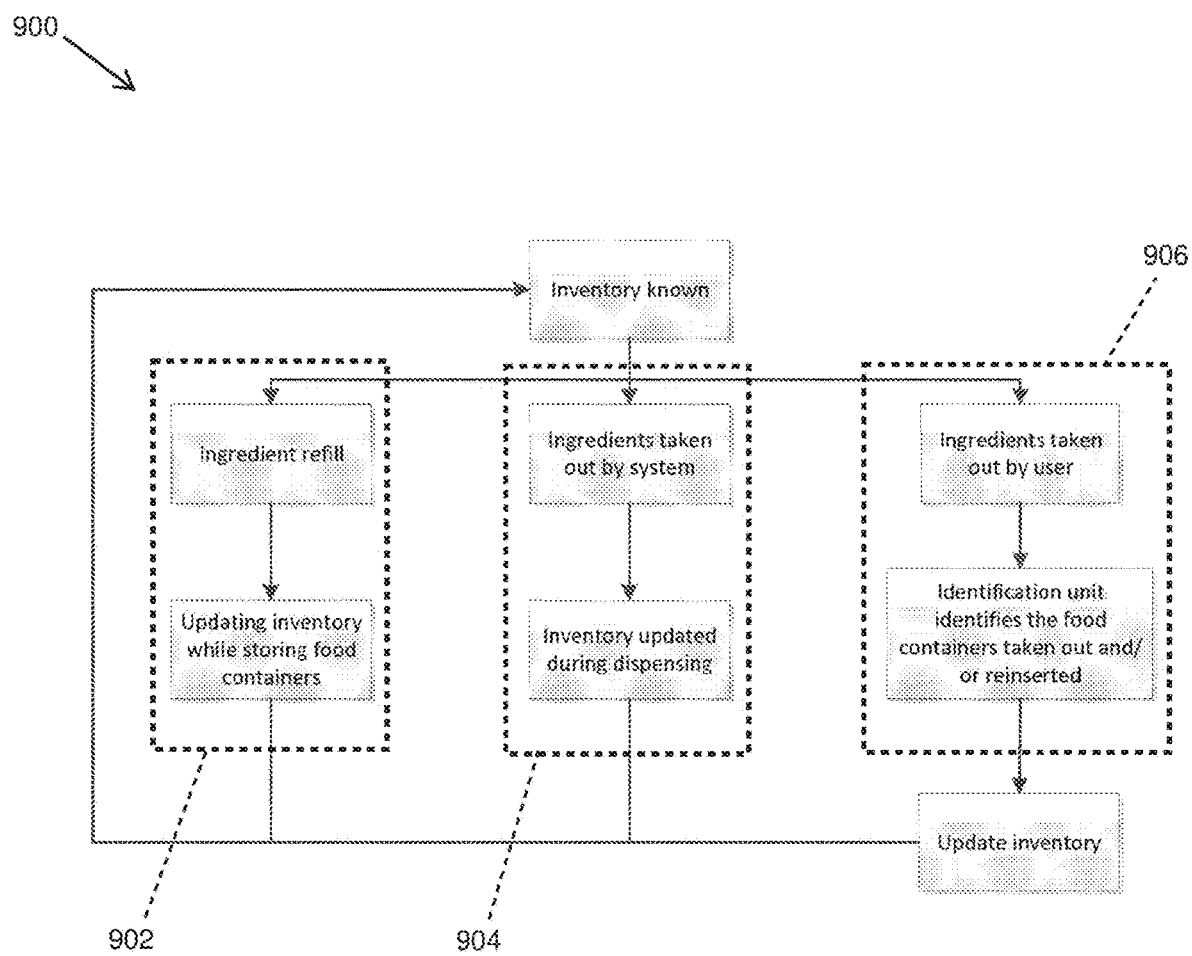
FIG. 16 is a block diagram illustrating an inventory process of the system.

Referring to 902 of FIG. 16, once the at least one missing ingredient is provided in the vicinity of the system 100, the user decants part of the ingredients to at least one food container while leaving sous-vide bags or cans as is. The collecting element 400 is then actuated by the control system 500 to grab the at least one food container, sous-vide bag or can provided and place it in the upper and/or lower storage compartments 206, 204, or in the fridge 110 or freezer 120.

The moving mechanism 402 is actuated by the control system 500 for moving the collecting element 400 vertically in registry with the at least one food container thanks to motor 412 being rotated for displacing the timing belt 410 until the collecting element 400 is in the vicinity thereof. The first and second joints 424 and 432 are rotated thanks to the stepper motors 426, 436 and the encoders 430, 438 provide up-to-date spatial information on the position and movements of the intermediate and distal members 418b, 418c for conveying the grabbing member 600 proximate to the at least one food container. The grabbing member 600 is then actuated by the control system 500 for grabbing the food container. The servo motors 604a and 604b are actuated to position the gripper assembly 612 to enable the grabbing of the food container. The servo motor 620 is actuated to squeeze the grippers 616a and 616b onto the food container. The collecting element 400 is then operated to position the food container under the identification camera 302 for identifying the identification means 306 located thereon. The load cells 602a and 602b further provide an indication of the weight of the transported food container to the control system 500. The inventory 900 of the system 100 is therefore updated.

Each food container transported by the collecting element 400 is then stored in the plurality of drawers of the upper and/or lower storage compartments 206, 204, in the fridge 110 or in the freezer 120, depending if the ingredients need to be stored at cold temperatures. These steps are carried out as long as food containers are left unstored in the vicinity of the system 100.

Referring to 906 of FIG. 16, where a user removes food containers from the furniture unit 202, the fridge 110 and/or the freezer 120, the identification camera 302 identifies the removed food containers and updates the inventory once the food containers are reinserted into the furniture unit 202, the fridge 110 or the freezer 120. If the user does not reinsert the removed food containers, the control system 500 updates the inventory regarding the missing food containers. If the user reinserts the food containers into the drawers of the furniture unit 202 or into the fridge 110 or the freezer 120, the identification camera 302 identifies the identification means 306 of the food containers as they are stored back. The collecting element 400 is then actuated to grab each reinserted food container and the load cells 602a and 602b provide, to the control system 500, an updated weight of the ingredients remaining therein.

Referring back to processing step 714 of the method 700, once all the required ingredients are available, the control system 500 generates a task schedule 1000 for preparing and cooking the desired meal. An exemplary task schedule 1000 is shown in FIG. 17. The task schedule 1000 provides the times at which each step has to be carried out, specifies the appropriate dispensing quantities of the appropriate ingredients, specifies in what order the cooking devices need to be used, what function the cooking devices must carry out (e.g., blending, steaming, mixing, etc.), the cooking temperatures, etc.

In one embodiment, if a food container is located in the freezer 120 and must be defrosted, the task schedule 1000 takes into account the time necessary for defrosting the ingredient before it can be prepared and/or cooked.

Figure 18:
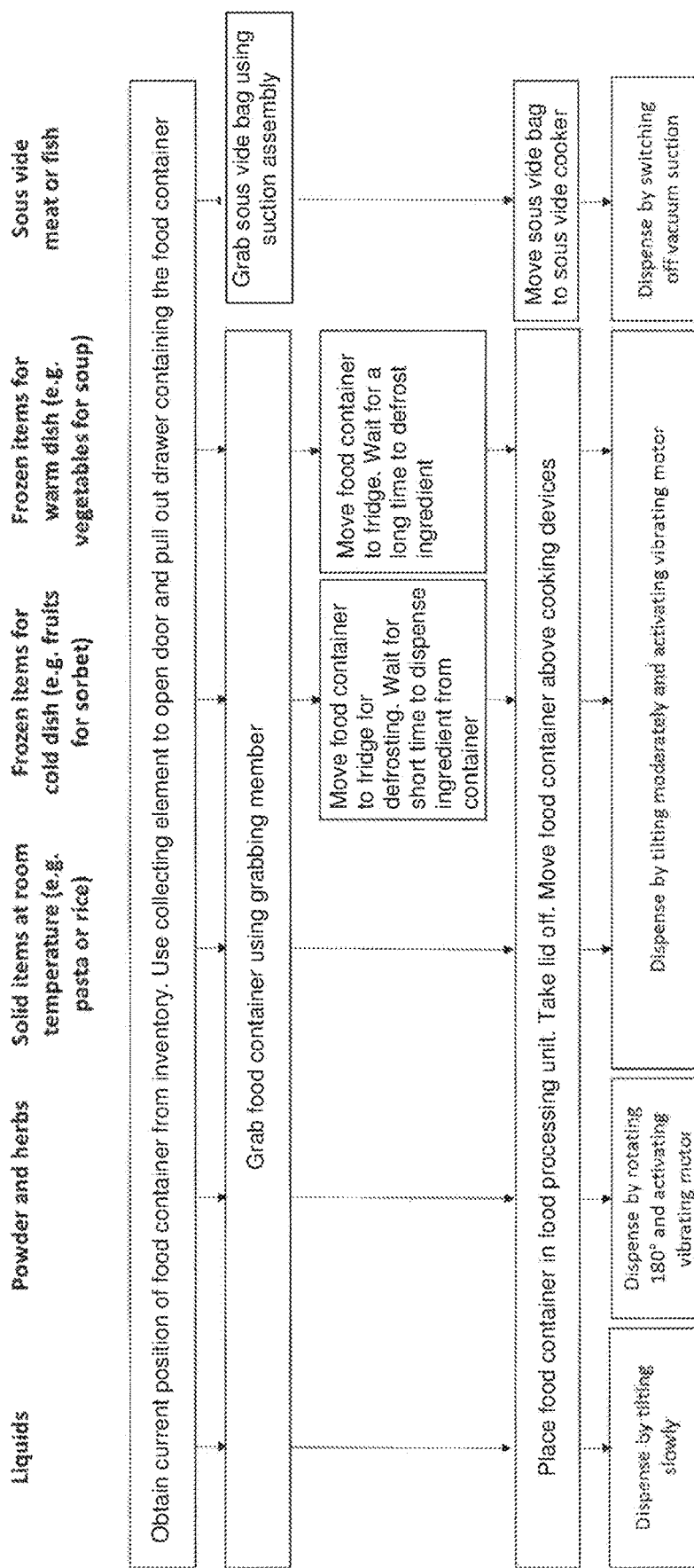
FIG. 18 is a block diagram illustrating the dispensing of ingredients from food containers carried out by the collecting element.

Referring back to processing step 716 of the method 700, as the task schedule 1000 is executed, the control system 500 follows each step thereof and actuates the collecting element 400 and the food processing unit 200 accordingly. As shown in FIG. 18, the control system 500 obtains the current position of the at least one food container necessary for carrying out the selected recipe. The moving mechanism 402 is actuated to position the collecting element 400 in registry with the appropriate food container. The appropriate food container is grabbed and transported by the grabbing member 600 to the food processing unit 200. The food container is then placed into the cavity 213 of the food container opening mechanism 212. Once positioned and maintained therein, the grabbing member 600 removes the lid of the food container. The control system 500 subsequently actuates the servo motors 604a and 604b for rotating shafts 606a, 606b and 610 for tilting the food container for dispensing the ingredients.

As the ingredients are dispensed in the food processing unit 200, the inventory 900 of the system 100 is updated. Information, such as the new weight of the ingredients remaining in the food containers is provided to the control system 500 by the load cells 602a and 602b, as shown at 904 of FIG. 16.

In one embodiment, the control system 500 actuates the servo motors 604a, 604b for rotating the gripper assembly 612 and the servo motor 620 for squeezing the grippers 616a and 616b onto the food container so that the food container is tightly grabbed.

In one embodiment, the food containers need to be defrosted in order to be used in the selected recipe. The moving mechanism 402 in collaboration with the collecting element 400 grabs and transports the food containers out from the freezer 120 and into the fridge 110 to be defrosted.

In the case where sous-vide bags are used, the moving mechanism 402 collaborates with the collecting element 400 to position the suction assembly 650 over the sous-vide bag. As the vacuum is created, the sous-vide bag is tightly grabbed. The sous-vide bag is then transported to the food processing unit 200. The collecting element 400 in collaboration with the grabbing member 600 positions the sous-vide bag over the sous-vide cooker 210 and the control system 500 switches off the vacuum pressure in the suction assembly 650 for dropping the sous-vide bag into the sous-vide cooker 210.

In one embodiment, in the case of liquids, the shafts 606a, 606b and 610 of the grabbing member 600 are slowly rotated.

In one embodiment, in the case of powder and herbs, the food container is rotated 180 degrees by the shaft 610 and shaken by vibrating motor 630.

In one embodiment, in the case of solid items at room temperature such as pasta or rice, frozen items for cold dishes such frozen fruits for sorbets or frozen items for warms dishes such as vegetables for soup, the shaft 610 is rotated moderately and the food container is shaken by the vibrating motor 630.

The previous steps are repeated until all the ingredients of the selected recipe are dispensed in the food processing unit 200.

The control system 500 manages the cooking devices 208a and 208b by specifying for example the different cooking modes such as stirring or cooking, the different cooking temperatures, etc, by following the information provided in the task schedule 1000.

It will be appreciated that the temperature of the water basin of the sous-vide cooker 210 adapted to receive vacuum-sealed ingredients, such as the sous-vide bags previously mentioned, is controlled by the control system 500.

It should be understood by a person skilled in the art that the user interface allows for a plurality of users to be registered. In this configuration, the control system 500 can save the preferences of each user and therefore provide suggestions to the users according to their previous meals.

In an alternative, a person skilled in the art will appreciate that the system 100 may be contemplated for the preparation of beverages, without departing from the scope of the invention.

Figure 19:
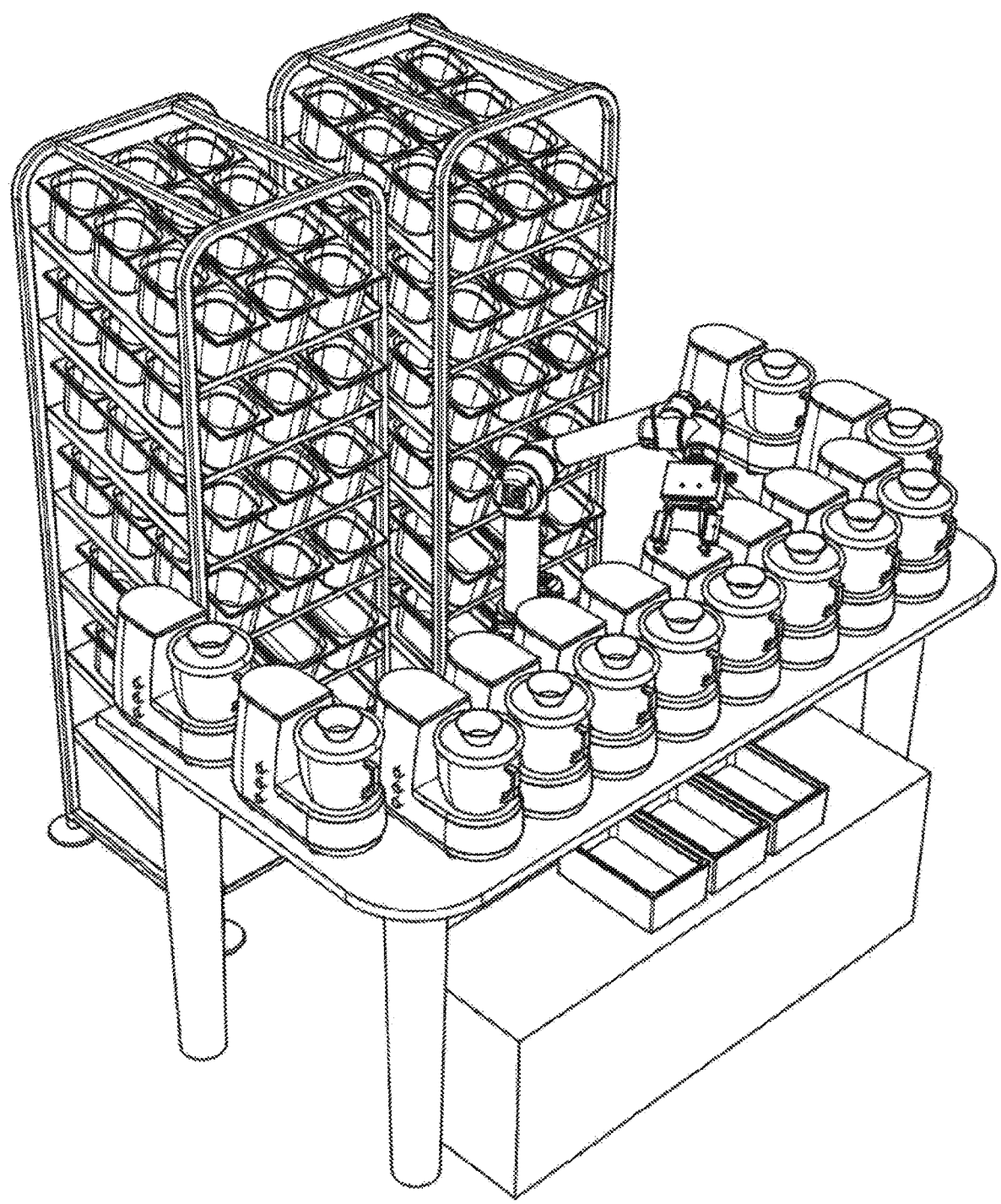
FIG. 19 is a view illustrating an embodiment of a system wherein the collecting element comprises a portion of a multiaxis robot.

It will be appreciated that in another alternative embodiment, the collecting element 400 comprises a portion of a multiaxis robot. Now referring to FIG. 19, there is shown such embodiment.

In one embodiment, the multiaxis robot comprises a six-axis robot. Still in this embodiment, the six-axis robot is Universal Robot UR5, disclosed at https://www(dot)universal-robots(dot)com/products/ur5-robot/.

It will further be appreciated that in another alternative embodiment, the collecting element 400 comprises a portion of a robot made of a combination of a robot of a given type with a robot of another type. For instance, it is possible to attach a three-axis arm to a Cartesian vertical and horizontal axis.

While this has not been disclosed previously, it will be appreciated that the system disclosed herein may be further provided with a device for detecting a human presence in close vicinity to a potentially harmful component of the system, such as for instance the collecting element 400. The skilled addressee will appreciate that the device for detecting a human presence may be of great interest in order to avoid any incident caused by the operation of the system. The skilled addressee will further appreciate that the device for detecting a human presence may be provided according to various embodiments. In one embodiment, the device for detecting a human presence may use an infrared detector. In another embodiment, the device for detecting a human presence in close vicinity to the system may use a proximity sensor. In another alternative embodiment, safety light curtains, as well as laser scanners disclosed, for instance, at https://www(dot)bannerengineering(dot)com/sg/en/products/machine-safety(dot)html may be used.

It will also be appreciated that in one embodiment, the system 100 disclosed above may further comprise a camera, not shown, operatively connected to the control system 500 which provides corresponding positioning data associated with at least one of the food processing unit 200, the plurality of food containers and the collecting element 400. The skilled addressee will appreciate that this may be of great interest in order to monitor a displacement of one of the food processing unit 200, the plurality of food containers and the collecting element 400.

It will be appreciated that in one embodiment, the control system 500 is operatively connected to a point-of-sale system comprising at least one of a payment terminal, a touch screen, a QR code reader and a bar code scanner. In such embodiment, a user may operate the system 100 once a transaction has been performed at the point-of-sale system.

It will be appreciated that in one embodiment, the collecting element 400 is located inside a fenced area. It will also be appreciated that at least one part of the fenced area may comprise a transparent material suitable for enabling a user to observe a cooking process. It will also be appreciated that in one embodiment at least one part of the fenced area may comprise an aperture sized and shaped for allowing a human access to the food processing unit. This may be of great advantage to enable a limited yet secure human access to the fenced area. The skilled addressee will appreciate that various alternative embodiments may be possible.

It will be appreciated that the system disclosed herein is of great advantages for various reasons.

In fact, in addition to what has been disclosed above, another advantage of the system disclosed herein is that it does not comprise a robot which tries to mimic a human cooking behavior. For instance, it will be appreciated that trying to dispense salt precisely like a human using the fingertips of a robot or a spoon held by the hand of a robot is very challenging to impossible using current technology.

Another advantage of the system disclosed above is that, by advantageously using a multifunctional cooking device, the number of hardware components required to cook complex dishes is limited. Another advantage is that it enables the cooking of a large amount of recipes which either would not be possible with standard food preparation devices such as blender, cooker, etc., or would require a large number of hardware components which would be very cumbersome. For instance, transferring, using a robot, chopped onions, garlic or herbs from a chopping device to a cooking device could be very challenging.

The embodiments described above are intended to be exemplary only. The scope of the invention is therefore intended to be limited solely by the appended claims.

Clause 1. A system for automatically preparing meals according to a selected recipe, the system comprising:
- a food processing unit for performing a set of food preparation tasks, wherein the food processing unit comprises at least one multifunctional cooking device adapted for performing a first food preparation task selected from a group consisting of mixing, stirring and chopping and a second food preparation task comprising heating;
- a plurality of food containers, each food container for storing a given ingredient;
- an identification unit for identifying the selected given food container;
- a collecting element for collecting a selected given food container of either the plurality of food containers located in a vicinity of the collecting element or from another plurality of food containers located in one of a fridge and a freezer located in a vicinity of the collecting element, the collecting element comprising a grabbing member for grabbing the selected given food container; further wherein the collecting element is moveable along a substantially vertical axis; and
- a control system operatively connected to the food processing unit, to the identification unit and to the collecting element, the control system adapted to manage the food processing unit and the collecting element to thereby prepare food according to a selected recipe.

Clause 2. The system as claimed in clause 1, wherein the food processing unit further comprises a water cooker adapted for performing one of a regular cooking task and a sous-vide food preparation task.

Clause 3. The system as claimed in clause 2, further comprising a food container opening mechanism.

Clause 4. The system as claimed in clause 1, wherein at least one food container is stored in a furniture unit.

Clause 5. The system as claimed in clause 4, wherein the furniture unit comprises at least one storage compartment for storing at least one corresponding food container.

Clause 6. The system as claimed in clause 5, wherein at least one storage compartment of the at least one storage compartment comprises at least one drawer for storing at least one food container.

Clause 7. The system as claimed in clause 1, wherein each of the plurality of food containers comprises a corresponding identification means.

Clause 8. The system as claimed in clause 7, wherein each identification means is selected from a group consisting of an SKU barcode, an RFID tag, a graphic element, a QR code and a text.

Clause 9. The system as claimed in clause 8, wherein the graphic element comprises at least one of an icon and a symbol.

Clause 10. The system as claimed in any one of clauses 1 to 9, wherein the identification unit comprises an identification camera for identifying the identification means of the at least one food container.

Clause 11. The system as claimed in any one of clauses 1 to 10, wherein the collecting element comprises at least one member displaceable in a horizontal plane.

Clause 12. The system as claimed in any one of clauses 4 to 6, wherein the collecting element comprises:
- a proximal member, displaceable along the substantially vertical axis;
- at least one intermediate member, rotatable in the horizontal plane and rotatably coupled to the proximal member; and
- a distal member, rotatable in the horizontal plane and rotatably coupled to the at least one intermediate member, the distal member comprising the grabbing member for grabbing a selected food container.

Clause 13. The system as claimed in any one of clauses 1 to 12, wherein the system further comprises at least one load cell for measuring a corresponding weight of an ingredient.

Clause 14. The system as claimed in any one of clauses 12 and 13, wherein the proximal member is coupled to the at least one intermediate member using a motor.

Clause 15. The system as claimed in any one of clauses 12 and 13, wherein the at least one intermediate member and the distal member are coupled using at least one motor.

Clause 16. The system as claimed in any one of clauses 14 and 15, wherein the motor coupling the proximal member to the at least one intermediate member and the motor coupling the at least one intermediate member to the distal member each comprises an encoder for providing spatial information of the at least one intermediate member and the distal member to the control system.

Clause 17. The system as claimed in clause 12, wherein the proximal member is moved along a wall of the furniture unit.

Clause 18. The system as claimed in any one of clauses 1 to 17, wherein the grabbing member is configured to be rotated in a position for grabbing or releasing a selected food container, the grabbing member being rotatable around a first axis of rotation and around a second axis of rotation, wherein the first axis of rotation is perpendicular to the second axis of rotation.

Clause 19. The system as claimed in any one of clauses 1 to 18, wherein the grabbing member comprises at least two grippers operated by movable means, each gripper comprising a contact surface for contacting a selected food container and wherein at least one gripper is movable for grabbing or releasing a selected food container.

Clause 20. The system as claimed in clause 19, wherein at least one gripper of the at least two grippers comprises a food quality detector.

Clause 21. The system as claimed in any one of clauses 19 and 20, wherein at least one gripper of the at least two grippers comprises a vibrating element for shaking a given food container for dispensing an ingredient.

Clause 22. The system as claimed in clause 21, wherein the vibrating element comprises a motor.

Clause 23. The system as claimed in clause 1, wherein the grabbing member comprises a suction assembly for creating a vacuum to thereby grab a mating surface.

Clause 24. The system as claimed in clause 1, wherein the control system is operated via a user interface.

Clause 25. The system as claimed in clause 24, wherein the user interface is selected from a group comprising at least one of a touchscreen, a voice recognition software, an application platform and a keyboard.

Clause 26. The system as claimed in any one of clauses 24 and 25, wherein the control system is operated by a user via a wireless connection.

Clause 27. A method for automatically preparing food according to a selected recipe, the method comprising:
- providing an indication of a food preparation, the food preparation requiring at least one ingredient;
- determining an availability of a user for providing the at least one missing ingredient;
- selecting a recipe;
- checking if the at least one required ingredient for preparing the selected recipe is available;
- if the at least one required ingredient is available:
  - obtaining a task schedule for the food preparation; and
  - executing the obtained task schedule using the system as claimed in any one of clauses 1 to 26 to thereby prepare the food.

Clause 28. The method as claimed in clause 27, wherein the indication of a food preparation to be prepared comprises an indication of a choice of food to be prepared, an indication of a desired time for completing the food preparation and an indication of a number of guest for which the food is prepared.

Clause 29. The method as claimed in any one of clauses 27 and 28, wherein the system randomly selects a recipe based on a profile of the user.

Clause 30. The method as claimed in clause 29, wherein the profile of the user comprises at least one recipe selected by the user.

Clause 31. The method as claimed in clause 27, wherein the checking to find out if at least one ingredient required for preparing the selected recipe is available is carried out using:
- the collecting element, displaceable for grabbing a selected food container located in the vicinity thereof;
- the grabbing member of the collecting element for grabbing the selected food container;
- at least one load cell of the collecting element for measuring the weight of the selected food container and for transmitting the measured weight to the control system;
- the identification unit for identifying an identification means of the grabbed food container and for transmitting the information of the grabbed food container to the control system; and
- the control system for receiving the information provided by the at least one load cell and the identification unit and for evaluating the feasibility of the selected recipe.

Clause 32. The method as claimed in clause 31, wherein the information transmitted to the control system by the collecting element and the identification unit comprises a type of ingredient stored in a given food container, an expiry date of the ingredient and a weight of the given food container.

Clause 33. The method as claimed in clause 27, further wherein if the user is not available to provide the at least one missing ingredient, the method further comprises providing a list of at least one alternative recipe.

Clause 34. The method as claimed in clause 30, wherein the identification means of the food container is selected from a group comprising at least one of an SKU barcode, an RFID tag, a graphic element, a QR code and a text.

Clause 35. The method as claimed in any one of clauses 27 to 34, further comprising providing a notification to the user once the task schedule is executed.

Clause 36. The system as claimed in clause 1, wherein the collecting element comprises a portion of a multiaxis robot.

Clause 37. The system as claimed in clause 36, wherein the multiaxis robot comprises a six-axis robot.

Clause 38. The system as claimed in clause 1, wherein the collecting element comprises a Cartesian coordinate arm having a plurality of linear connections, each actuated by a linear actuator.

Clause 39. The system as claimed in any one of clauses 1 to 26, further comprising a device for detecting a human presence in close vicinity to the system.

Clause 40. The system as claimed in any one of clauses 1 to 26, wherein the grabbing member is adapted to avoid a direct interaction with food.

Clause 41. The system as claimed in any one of clauses 1 to 5, wherein the identification unit comprises a lookup table operatively connected to the control system and comprising for each food container an indication of a respective content and a respective physical location.

Clause 42. The system as claimed in any one of clauses 1 to 26 and 36 to 41, further comprising a camera operatively connected to the control system and providing corresponding positioning data associated with at least one of the food processing unit, the plurality of food containers and the collecting element.

Clause 43. The system as claimed in any one of clauses 1 to 26 and 36 to 42, wherein the food processing unit is operatively connected to the control system using at least one of a USB connection, a WLAN connection, a network cable and a Bluetooth connection.

Clause 44. The system as claimed in any one of clauses 1 to 26 and 36 to 43, wherein the control system is operatively connected to a point-of-sale system comprising at least one of a payment terminal, a touch screen, a QR code reader and a bar code scanner.

Clause 45. The system as claimed in any one of clauses 1 to 26 and 36 to 44, wherein the collecting element is located inside a fenced area.

Clause 46. The system as claimed in clause 45, wherein at least one part of the fenced area comprises a transparent material.

Clause 47. The system as claimed in any one of clauses 45 to 46, wherein at least one part of the fenced area comprises an aperture sized and shaped for allowing an access to the food processing unit.

The invention claimed is:

1. A system for automatically preparing meals according to a selected recipe, the system comprising:
    a food processing unit for performing a set of food preparation tasks, wherein the food processing unit comprises at least one multifunctional cooking device including at least one load cell and adapted for performing a first food preparation task selected from a group consisting of mixing, stirring and chopping and a second food preparation task comprising heating;
    a plurality of food containers, each food container for storing a given ingredient;
    an identification unit for identifying the selected given food container;
    at least one rail located adjacent to the food processing unit;
    a collecting element for collecting a selected given food container of either the plurality of food containers located in a vicinity of the collecting element or from another plurality of food containers located in one of a fridge and a freezer located in a vicinity of the collecting element, the collecting element comprising a grabbing member for grabbing the selected given food container, wherein the grabbing member is adapted to avoid direct interaction with food, and wherein the grabbing member comprises a pair of load cells configured to measure a corresponding weight of a selected food container grabbed by the collecting element;
    wherein the collecting element is moveable along the at least one rail to enable smooth movement of the collecting element; and
    a control system operatively connected to the food processing unit, to the identification unit and to the collecting element, the control system adapted to manage the food processing unit and the collecting element to thereby prepare food according to the selected recipe,
    wherein a preparation of a given meal involving a corresponding plurality of food preparation tasks is performed by a given multifunctional cooking device of the food processing unit, the given multifunctional cooking device performing the corresponding plurality of food preparation tasks without any transfer outside the given multifunctional cooking device to another device in a preparation of a food task prior to completion of the given meal.

2. The system as claimed in claim 1, wherein the food processing unit further comprises a water cooker adapted for performing a third food preparation task comprising one of a regular cooking task and a sous-vide food preparation task.

3. The system as claimed in claim 2, further comprising a food container opening mechanism.

4. The system as claimed in claim 1, wherein at least one food container is stored in a furniture unit.

5. The system as claimed in claim 1, wherein each of the plurality of food containers comprises a corresponding identification means.

6. The system as claimed in claim 5, wherein the identification unit comprises an identification camera for identifying the identification means of the at least one food container.

7. The system as claimed in claim 1, wherein the collecting element comprises at least one member displaceable in a horizontal plane.

8. The system as claimed in claim 4, wherein the collecting element comprises:
    a proximal member, displaceable along the substantially vertical axis;
    at least one intermediate member, rotatable in the horizontal plane and rotatably coupled to the proximal member; and
    a distal member, rotatable in the horizontal plane and rotatably coupled to the at least one intermediate member, the distal member comprising the grabbing member for grabbing a selected food container.

9. The system as claimed in claim 1, wherein the grabbing member comprises at least two grippers operated by movable means, each gripper comprising a contact surface for contacting a selected food container and wherein at least one gripper is movable for grabbing or releasing a selected food container.

10. The system as claimed in claim 9, wherein at least one gripper of the at least two grippers comprises a vibrating element for shaking a given food container for dispensing an ingredient.

11. The system as claimed in claim 10, wherein the vibrating element comprises a motor.

12. The system as claimed in claim 1, wherein the grabbing member comprises a suction assembly for creating a vacuum to thereby grab a mating surface.

13. The system as claimed in claim 1, wherein the control system is operated via a user interface.

14. The system as claimed in claim 1, wherein the collecting element comprises a portion of a multiaxis robot.

15. The system as claimed in claim 14, wherein the multiaxis robot comprises a six-axis robot.

16. The system as claimed in claim 1, further comprising a device for detecting a human presence in close vicinity to the system.

17. The system as claimed in claim 1, wherein the identification unit comprises a lookup table operatively connected to the control system and comprising for each food container an indication of a respective content and a respective physical location.

18. The system as claimed in claim 1, further comprising a camera operatively connected to the control system and providing corresponding positioning data associated with at least one of the food processing unit, the plurality of food containers and the collecting element.

19. The system as claimed in claim 1, wherein the control system is operatively connected to a point-of-sale system comprising at least one of a payment terminal, a touch screen, a QR code reader and a bar code scanner.

20. The system as claimed in claim 1, wherein the collecting element is located inside a fenced area.

21. The system as claimed in claim 20, wherein at least one part of the fenced area comprises an aperture sized and shaped for allowing an access to the food processing unit.

22. A system for automatically preparing meals according to a selected recipe, the system comprising:
   a food processing unit for performing a set of food preparation tasks, wherein the food processing unit comprises at least one multifunctional cooking device adapted for performing a first food preparation task selected from a group consisting of mixing, stirring and chopping and a second food preparation task comprising heating;
   a plurality of food containers, each food container for storing a given ingredient; an identification unit for identifying the selected given food container;
   a collecting element for collecting a selected given food container of either the plurality of food containers located in a vicinity of the collecting element or from another plurality of food containers located in one of a fridge and a freezer located in a vicinity of the collecting element, the collecting element comprising a grabbing member for grabbing the selected given food container, wherein the grabbing member is adapted to avoid direct interaction with food, and wherein the grabbing member comprises a pair of load cells configured to measure a corresponding weight of a selected food container grabbed by the collecting element;
   at least one rail located adjacent to the food processing unit, the at least one rail being configured to enable smooth movement of the collecting element along an axis;
   a control system operatively connected to the food processing unit, to the identification unit and to the collecting element, the control system being adapted to manage the food processing unit and the collecting element to thereby prepare food according to the selected recipe.

23. The system as claimed in claim 22, wherein the at least one multifunctional cooking device includes at least one load cell.

24. The system as claimed in claim 22, wherein the grabbing member comprises a pair of load cells configured to measure a weight of a selected on of the plurality of food containers grabbed by the collecting element.

25. The system as claimed in claim 22, wherein the collecting element comprises at least one member displaceable in a horizontal plane.

26. The system as claimed in claim 25, wherein the collecting element comprises:
   a proximal member, displaceable along a substantially vertical axis;
   at least one intermediate member, rotatable in the horizontal plane and rotatably coupled to the proximal member; and
   a distal member, rotatable in the horizontal plane and rotatably coupled to the at least one intermediate member, the distal member comprising the grabbing member for grabbing a selected food container.

27. The system as claimed in claim 22, further including at least one load cell located on any one of the proximal member, the intermediate member, and the distal member.

28. The system as claimed in claim 22, further including at least one load cell remotely connected to the control system to enable the system to follow recipe instruction concerning dosage of ingredients.

* * * * *